US007695602B2

(12) United States Patent
Völkel et al.

(10) Patent No.: US 7,695,602 B2
(45) Date of Patent: Apr. 13, 2010

(54) SYSTEMS AND METHODS FOR TRANSPORTING PARTICLES

(75) Inventors: Armin R. Völkel, Mountain View, CA (US); David Biegelsen, Portola Valley, CA (US); Philip D. Floyd, San Francisco, CA (US); Greg Anderson, Emerald Hills, CA (US); Fred Endicott, San Carlos, CA (US); Eric Peeters, Fremont, CA (US); Jaan Noolandi, Mississauga (CA); Karen A. Moffat, Brantford (CA); Peter M. Kazmaier, Mississauga (CA); Maria McDougall, Burlington (CA); Daniel G. Bobrow, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 1203 days.

(21) Appl. No.: 10/988,158

(22) Filed: Nov. 12, 2004

(65) Prior Publication Data

US 2006/0102525 A1 May 18, 2006

(51) Int. Cl.
*B01D 59/42* (2006.01)
*B41J 2/41* (2006.01)

(52) U.S. Cl. ....................... 204/544; 204/660; 204/674; 204/670; 347/112; 347/120; 347/128

(58) Field of Classification Search ................. 204/554, 204/660, 674, 670, 672; 347/112, 120, 128; 361/225, 226, 233; 209/127.1
See application file for complete search history.

(56) References Cited

U.S. PATENT DOCUMENTS

| | | | |
|---|---|---|---|
| 4,527,884 A | 7/1985 | Nusser | |
| 4,558,941 A | 12/1985 | Nosaki et al. | |
| 4,647,179 A | 3/1987 | Schmidlin | |
| 4,896,174 A | 1/1990 | Stearns | |
| 5,281,982 A | 1/1994 | Mosehauer et al. | |
| 5,305,016 A * | 4/1994 | Quate | 347/46 |
| 5,400,062 A | 3/1995 | Salmon | |
| 5,717,986 A | 2/1998 | Vo et al. | |
| 5,850,587 A | 12/1998 | Schmidlin | |
| 5,893,015 A | 4/1999 | Mojarradi et al. | |
| 6,059,398 A * | 5/2000 | Desie et al. | 347/55 |
| 6,070,036 A | 5/2000 | Thompson et al. | |
| 6,112,044 A | 8/2000 | Thompson et al. | |
| 6,116,718 A | 9/2000 | Peeters et al. | |
| 6,134,412 A | 10/2000 | Thompson | |
| 6,137,979 A | 10/2000 | Garstein et al. | |
| 6,149,789 A | 11/2000 | Benecke et al. | |
| 6,185,084 B1 * | 2/2001 | Tai et al. | 361/230 |
| 6,219,515 B1 | 4/2001 | Lestrange | |
| 6,246,855 B1 | 6/2001 | Gartstein et al. | |
| 6,272,296 B1 * | 8/2001 | Gartstein | 399/55 |
| 6,290,342 B1 | 9/2001 | Vo et al. | |
| 6,293,659 B1 | 9/2001 | Floyd et al. | |
| 6,296,752 B1 | 10/2001 | McBride et al. | |
| 6,328,409 B1 | 12/2001 | Peeters et al. | |
| 6,340,216 B1 | 1/2002 | Peeters et al. | |
| 6,351,623 B1 * | 2/2002 | Thayer et al. | 399/258 |

(Continued)

*Primary Examiner*—Tuyet Vo
(74) *Attorney, Agent, or Firm*—Fay Sharpe LLP

(57) ABSTRACT

Various particle transport systems and components for use in such systems are described. The systems utilize one or more traveling wave grids to selectively transport, distribute, separate, or mix different populations of particles. Numerous systems configured for use in two dimensional and three dimensional particle transport are described.

18 Claims, 17 Drawing Sheets

U.S. PATENT DOCUMENTS 6,416,158 B1 7/2002 Floyd et al.
6,416,159 B1 7/2002 Floyd et al.
6,439,711 B1 8/2002 Carlini et al.
6,454,384 B1 9/2002 Peeters et al.
6,467,862 B1 10/2002 Peeters et al.
6,467,871 B1 10/2002 Moffat et al.
6,499,831 B2 12/2002 Schmidlin
6,511,149 B1 1/2003 Peeters et al.
6,521,297 B2 2/2003 McDougall et al.
6,523,928 B2 2/2003 Peeters et al.
6,596,143 B1 7/2003 Wang et al.
6,598,954 B1 7/2003 Moffat et al.
6,719,399 B2 4/2004 Moffat et al.
6,751,865 B1 * 6/2004 Peeters et al. .............. 29/890.1
7,163,611 B2 * 1/2007 Volkel et al. ................ 204/547
7,217,901 B2 * 5/2007 Lean et al. ............... 209/127.1
7,235,123 B1 * 6/2007 Biegelsen ...................... 96/26
2006/0092234 A1 * 5/2006 Lean et al. .................... 347/65
2006/0197788 A1 * 9/2006 Usui ............................ 347/9

* cited by examiner

SYSTEMS AND METHODS FOR TRANSPORTING PARTICLES

BACKGROUND

The present exemplary embodiment relates to the transport of small particles or other samples. The exemplary embodiment relates to selective two dimensional and three dimensional movement of particles or samples.

Particles can be manipulated by subjecting them to traveling electric fields. Such traveling fields are produced by applying appropriate voltages to microelectrode arrays of suitable design. Traveling electric fields are generated by applying voltages of suitable frequency and phases to the electrodes.

Although a wide array of particle transport systems are known, including those that use traveling electric fields, a need remains for strategies and systems that are particularly adapted for selectively transporting particles over certain paths, or in a certain manner; systems that can be readily implemented and used with currently available systems; and systems of relatively small size that can be used to selectively transport and/or mix multiple populations of particles.

BRIEF DESCRIPTION

In accordance with one aspect of the present exemplary embodiment, a traveling wave grid assembly adapted for multiple dimensional transport of particulates is provided. The assembly comprises a substrate and a collection of individually addressable point electrodes located substantially uniformly over the substrate. The assembly also comprises an electronic controller in communication with the electrodes and adapted to apply an electrical waveform to the electrodes and thereby produce a traveling wave along the substrate.

In accordance with another aspect of the present exemplary embodiment, a multi-channel traveling wave grid assembly is provided. The assembly comprises a member defining at least a first channel and a second channel, each of the first and second channels defining an entrance and an exit. The exits of each of the first and second channels provide access to a common region also defined in the member. The assembly also comprises an electronic controller capable of providing voltage waveforms. The assembly further comprises a first traveling wave grid extending within the first channel and in communication with the electronic controller. The assembly further comprises a second traveling wave grid extending within the second channel and in communication with the electronic controller. Upon operation of the electronic controller, at least one waveform is applied to the first and second traveling wave grids to thereby produce traveling waves along the first and second channels defined in the member.

In accordance with another aspect of the present exemplary embodiment, a multi-layer traveling wave grid assembly is provided. The assembly comprises a first planar layer including a first traveling wave grid and a second planar layer spaced from the first layer. The second layer includes a second traveling wave grid. At least one of the first layer and the second layer defines a via extending through the layer and the layer defining the via further includes an electrode adapted to provide electrical communication across the layer.

In accordance with another aspect of the present exemplary embodiment, a method for selectively directing a particulate sample along one or more branches of a multi-branch traveling wave grid assembly is provided. The method comprises providing a multi-branch traveling wave grid assembly including (i) a substrate, (ii) a common electrode region disposed on the substrate, (iii) a plurality of traveling wave electrode grid branches extending from the common electrode region, and (iv) at least one electronic controller in electrical communication with the common electrode region and the plurality of traveling wave electrode grid branches and adapted to induce traveling waves on the common electrode region and the plurality of traveling wave electrode grid branches. The method also comprises a step of applying a particulate sample on at least one of the common electrode region and one or more branches of the plurality of traveling wave electrode grid branches. The method further comprises a step of selectively operating the at least one electronic controller to induce traveling waves upon select regions of the common electrode region and one or more branches of the traveling wave electrode grid branches. At least a portion of the particulate sample is selectively directed along one or more branches of the multi-branch traveling wave grid assembly.

In accordance with a further aspect of the present exemplary embodiment, a method for mixing different populations of particles in a multi-channel traveling wave grid assembly is provided. The assembly includes (i) a mixing region, (ii) a plurality of feed channels providing flow communication between a plurality of feed sources of different particle populations, each of the feed channels extending between the mixing region and a respective feed source and including a traveling wave grid, and (iii) an exit channel including a traveling wave grid, and (iv) an electronic controller in electrical communication with the traveling wave grids of the feed channel and the exit channel. The method comprises introducing a first population of particles to a first feed channel. The method also comprises introducing a second population of particles to a second feed channel. And, the method comprises operating the electronic controller to thereby induce (i) an electrostatic traveling wave along the traveling wave grid of the first feed channel and (ii) an electrostatic traveling wave along the traveling wave grid of the second feed channel, to thereby transport the first population of particles and the second population of particles to the mixing region at which the first and second populations of particles are mixed.

In accordance with another aspect of the present exemplary embodiment, a method for displacing a localized group of particulates across a region of an electrode grid is provided. The grid includes (i) a substrate, (ii) a plurality of electrodes disposed on the substrate, and (iii) an electrical controller in operative communication with the plurality of electrodes and adapted to actuate one or more select electrodes. The method comprises depositing a group of particulates on the plurality of electrodes. The method also comprises identifying a set of electrodes of the plurality of electrodes adjacent the group of particulates. And, the method comprises actuating the set of electrodes with the electrical controller to thereby displace the group of particulates.

DETAILED DESCRIPTION

Figure 1:
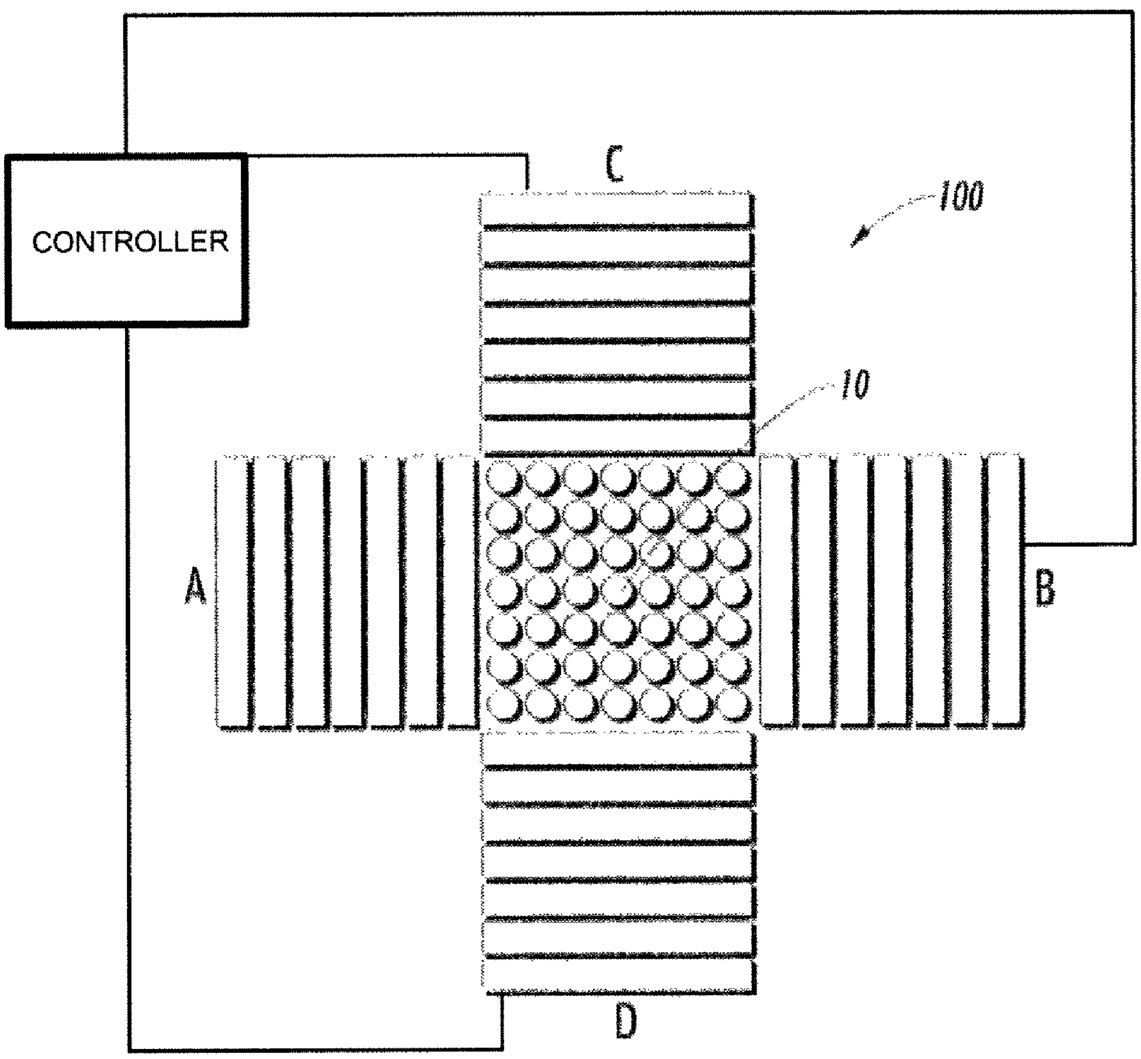
FIG. 1 is a schematic illustration of an exemplary embodiment system for transporting particles.

The exemplary embodiment provides strategies and systems for transporting particles or samples as sometimes referred to herein, and specifically for selectively directing them to a specific location. The exemplary embodiment is directed to transporting particles or sample in multiple dimensions such as two dimensions, in three dimensions, and sequential combinations of these types of motion. As described and illustrated herein, many of the exemplary embodiments utilize an electrode pattern that is provided and configured in such a way that in-plane traveling electrostatic fields can be created and controlled. With each electrode separately addressable, the phases and amplitudes of the signals to the electrodes can be used to synthetically approximate any pattern below the Nyquist limit. Generally, the collection of electrodes used in the exemplary embodiment system and methods are in the form of a traveling wave grid.

The term "traveling wave grid" as used herein collectively refers to a substrate, a plurality of electrodes to which a voltage waveform is applied to generate the traveling wave (s), and one or more busses, vias, and electrical contact pads to distribute the electrical signals (or voltage potentials) throughout the grid. The term also collectively refers to one or more sources of electrical power, which provides the multiphase electrical signal for operating the grid. The traveling wave grids may be in nearly any form, such as for example a flat planar form, or a non-planar form. Traveling wave grids, their use, and manufacture are generally described in U.S. Pat. Nos. 6,351,623; 6,290,342; 6,272,296; 6,246,855; 6,219,515; 6,137,979; 6,134,412; 5,893,015; and 4,896,174, all of which are hereby incorporated by reference. A variety of configurations and arrangements of traveling wave grids are contemplated including, but not limited to two dimensional and three dimensional traveling wave grids.

Although many of the exemplary embodiments are described in terms of the printing arts and transporting toner particles, the exemplary embodiments are applicable to other applications involving the storage, transport, distribution, mixing, or separation of particles or other samples. Specifically, the aspects and configurations of the embodiments described herein can be used in a number of operations, such as, but not limited to, splitting, merging, mixing, gating, depositing, and combinations of these operations. Exemplary applications include, but are not limited to printing, capsule or pill manufacturing, biological analyses, security applications involving the collection and analyses of unknown potential toxins, detection and other analytical applications, and it is contemplated that the embodiments described herein could be incorporated into lab-on-chip modules as known in the art.

In the various exemplary embodiments of traveling wave grid assemblies described herein, the assembly generally comprises a substrate and a collection of traveling wave electrodes disposed or otherwise deposited or formed on the substrate. In many of the exemplary embodiments, the traveling wave grid is in the form of a multi-leg pattern. That is, the assembly includes at least a first leg, a second leg, and a third leg in which the legs are generally in electrical communication with each other, and in most embodiments, in electrical or signal communication with a controller. The legs are arranged such that they define a common intersection region from which each leg extends. The exemplary embodiment includes a wide array of arrangements and configurations. For example, a multi-leg assembly including four legs can be used in which each leg extends outward from the intersection region at an angle of 90 degrees with respect to an adjacent leg. Alternatively, an assembly can be used in which the legs are arranged such that an angle of less than 90 degrees is defined between two adjacent legs. Or alternatively, the legs may be arranged such that an angle of greater than 90 degrees is defined between two adjacent legs. In certain embodiments, the intersection region may include a collection of point electrodes. Generally, these are individually addressable electrodes and when properly activated by a controller, can induce traveling waves across the intersection region in a variety of fashions. For example, vertical rows of point electrodes can be simultaneously activated to thereby induce traveling waves laterally across the intersection region. In contrast, rows of point electrodes can be activated to induce traveling waves to travel in a transverse direction across the region. Instead, or in addition, the intersection region may also include a collection of concentrically arranged arc electrodes. These can be sequentially activated to cause particulates to be focused to a center point, or alternatively, to spread out as they move radially outward. Each of these multi-leg assemblies is described in greater detail as follows.

Referring to FIG. 1, an exemplary embodiment system 100 is depicted comprising a collection of traveling wave grids. System 100 comprises traveling wave grids or arms, as noted, A-D; and a centrally disposed intersection region 10. A particle stream administered or supplied from the left in the A arm can be further transported to the B arm by driving the vertical columns of electrodes in the cross region 10 in phase and ideally in a sequential fashion, in the direction of A to B. In a related fashion, a layer of particles having been administered or supplied to the intersection region 10 can be transported up to C, down to D, divided so that a portion goes to C and another portion part goes to D, etc. If the phasing of the B array is opposite to that of the cross region 10, particles can be accumulated at the boundary between B and the intersection region 10. Then other particles can be transported into the intersection region 10 from A, C or D, and so provide a form of addition. Mixing can be achieved, for example, by exercising the particles using pseudo-random phases applied to the electrodes within the intersection region 10. The exemplary embodiment includes the use of a collection of individually addressable point electrodes within the intersection region. In the system 100 shown in FIG. 1, the point electrodes can be arranged in a rectangular matrix, however the exemplary embodiment includes a wide array of other arrangements and configurations. Generally, the point electrodes are arranged substantially uniformly over the region or substrate of interest.

Other systems or structures such as system 100 can be easily and inexpensively fabricated in a multilayer printed circuit board configuration using surface mounted high voltage array drivers such as those available from SuperTex, or the like. Heatable reaction regions can be included in the systems. Particle detection and analysis systems and components can also be integrated to enable property sensitive operations, including but not limited to feedback for determining completion of mixing, reaction, clearing, etc. Multiple layers of particle streams can be transported or otherwise selectively directed by stacking such boards and using vertical traveling wave gates to control inter-board flows. These aspects are described in greater detail herein.

More specifically, the exemplary embodiment relates to aspects in which properties found through detection or instrumentation or other analyses are used to determine or identify classes of particles, and this information enables sorting through the use of one or more traveling wave grids. Referring again to FIG. 1, a sorting function can be performed if a positively charged particle is transported along branch A to the right, by continuing the traveling wave along branch C, and applying a positive voltage or reversed phasing to the B branch. As a result, the particle would be driven along branch C.

Figure 2:
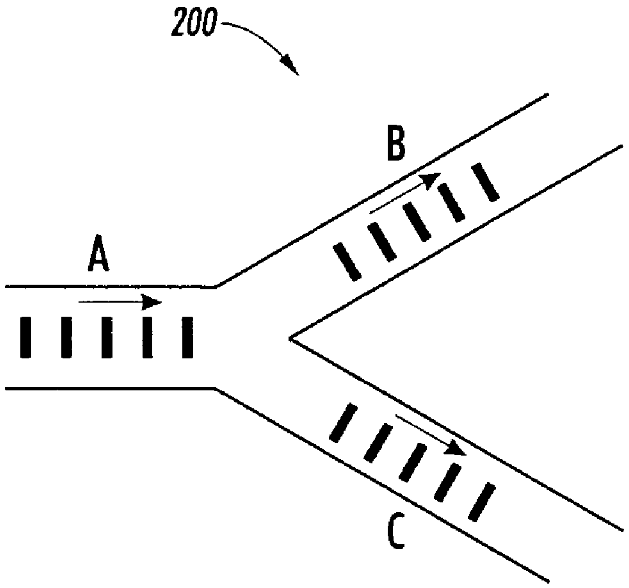
FIG. 2 is a schematic illustration of another exemplary embodiment system for transporting particles.

FIG. 2 depicts a system 200 with diverging (sorting) branches where particles can be driven along either branch B or branch C controlled by information determined along path A, such as for example a spectrographic analysis. Additional or subsequent differential analysis or processing can be done along each branch B and/or branch C.

Figure 3:
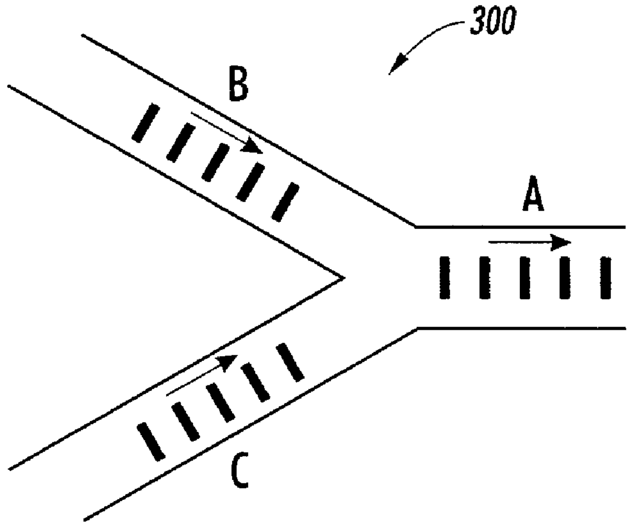
FIG. 3 is a schematic illustration of another exemplary embodiment system for transporting particles.

FIG. 3 illustrates a system 300 with converging (joining) branches where particles coming in along branches B and C can be brought together along branch A to create a mixture that can have appropriate composition or reactions. In FIG. 3, system 300 illustrates converging paths that allow particles to be brought together from different sources, supporting creating mixtures of particles in a controlled way, and supporting chemical and physical interactions between particles.

Figure 4:
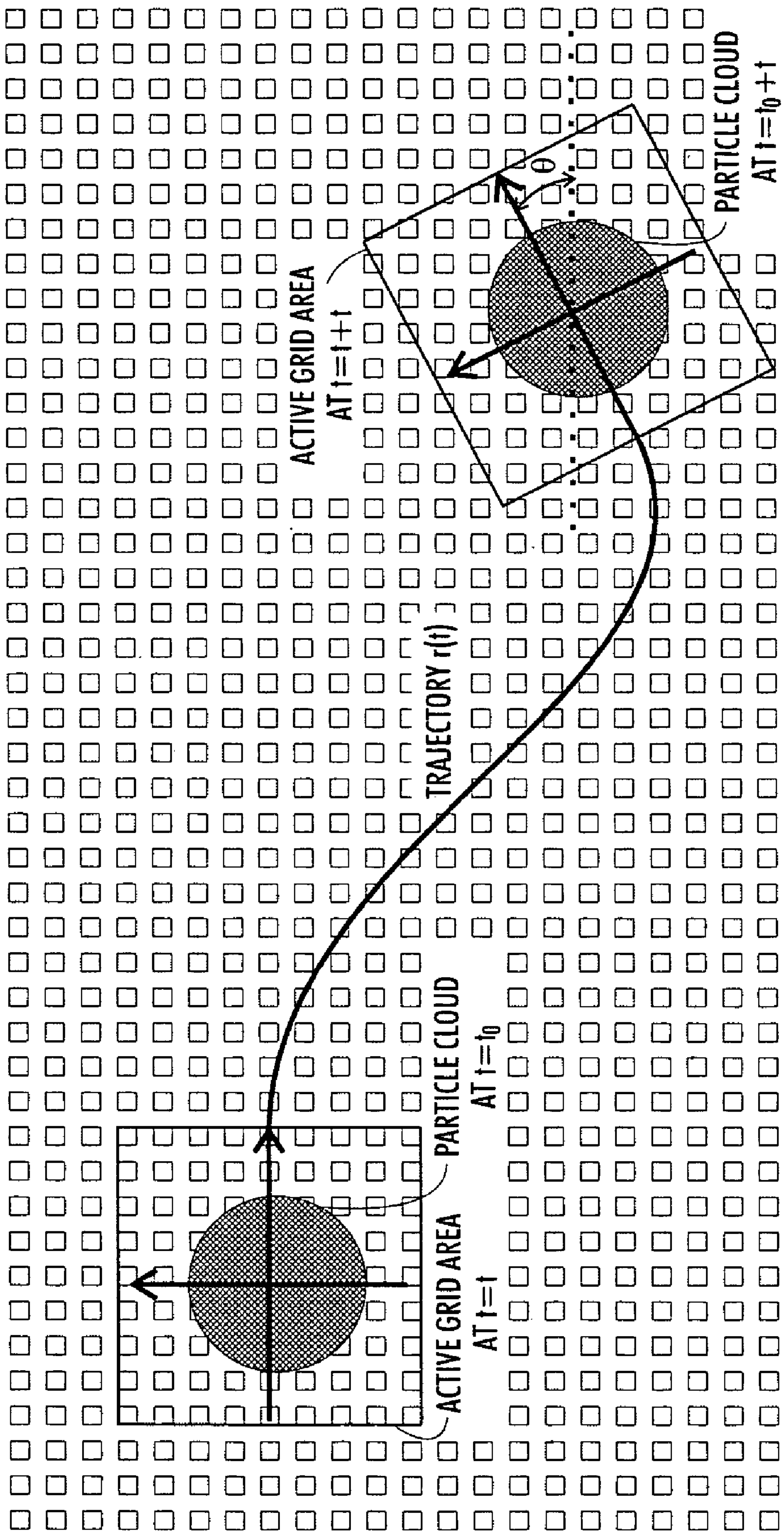
FIG. 4 is a schematic illustrating displacement of a particle cloud across a region of a traveling wave grid.

Referring to FIG. 4, both two dimensional and three dimensional traveling wave grids can utilize individually addressable electrodes or “point” electrodes to move localized particulate clouds on arbitrary paths by only actuating the electrodes around a group of particles or “cloud” as sometimes referred to herein. By using only a small subset of all the electrodes for a single cloud, several clouds can be moved independently as long as their trajectories do not overlap in space and time. Two or more individual clouds can be merged at specific location, or a single cloud can be split into two or more clouds.

Figure 5:
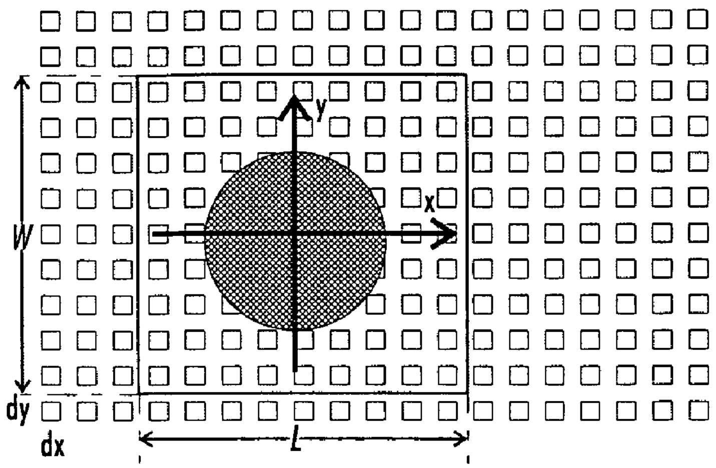
FIG. 5 is a detailed schematic of an exemplary embodiment particle cloud and its relation with a traveling wave grid.

As shown in FIG. 5, at any given time the active part of the traveling wave grid is several rows and columns of electrodes larger than the cloud. This is shown in FIG. 5 as the rectangular area having dimensions L and W. The voltage pattern $\Phi(x, y, t)$ on the active electrodes is such that the particulates experience a force in the direction of the trajectory. For the example depicted in FIGS. 4 and 5, the trajectory is parallel to the x axis, therefore the electric field points towards that direction. In a surfing mode the particles will move with the traveling wave, hence the particle cloud travels with the speed of the traveling wave. At $t=t_0$ the particulate cloud travels in x direction and the voltage pattern is given by $\phi((x,y),t_0)$. A local coordinate, system that always has the x axis in direction of motion undergoes a translation T $(=r(t_0+\tau)-r(t0))$ and a rotation (angle $\theta$ corresponding to the angle between the local x axis and the x axis at $t=t_0$). The same transformation is true for the corner points of the active grid. The voltage of an active electrode at $(x',y')$ at time $t_0+\tau$ is obtained from the voltage pattern at $t=t_0$ as:

$$\phi((x',y'),t_0+\tau)=\phi(R^{-1}(\theta)(x',y')-T^{-1},t_0)$$

Figure 6:
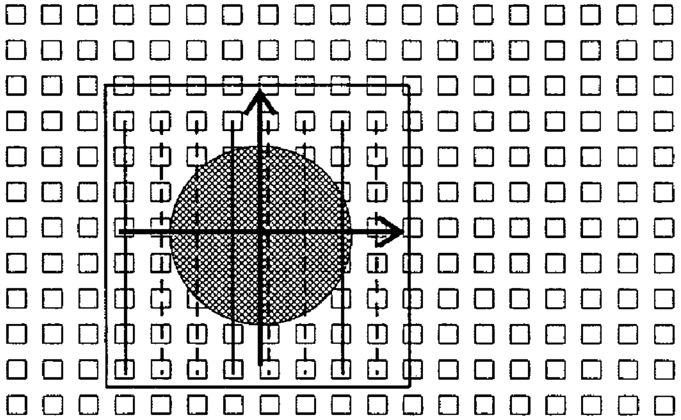
FIG. 6 illustrates a set of forces imparted upon the cloud.
Figure 7:
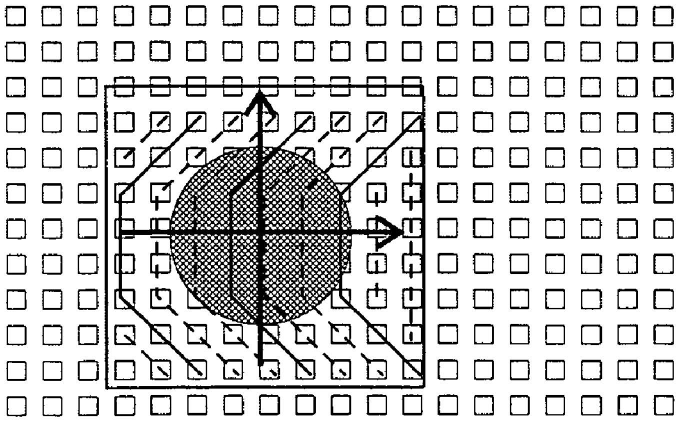
FIG. 7 illustrates another set of forces imparted upon the cloud.

Referring to FIG. 6, a standard traveling wave with electrodes on straight lines perpendicular to the direction of motion at the same potential is shown. The period of traveling wave can be any number $n>2$, and generally the period is $n=4$. As shown in FIG. 7, a U-shaped traveling wave pattern that auto-focuses the particles or clouds of particles as they travel along can be utilized. The angle of the outer electrodes with the inner electrodes for this pattern can be as large as 90 degrees. There are many more combinations possible that move and automatically focus the cloud at the same time. Extension to three dimensions is straightforward by making the noted patterns rotationally symmetric around the x axis. FIGS. 4-7 illustrate an example of point electrodes arranged substantially uniformly over a substrate or region of interest.

The exemplary embodiment also provides a layered or stacked array of channels and traveling wave grids. The arrays are particularly useful for mixing various populations or collections of particles, and in conjunction with transport of those particles to a component or location downstream. Specifically, a layered array of channels and traveling wave grids is provided which comprises at least two layers wherein each layer includes a substrate and a traveling wave grid. A traveling wave grid includes a collection of traveling wave electrodes generally disposed on the substrate. Each layer may additionally include a separating layer or barrier layer which defines, at least in part, a channel extending transversely to the collection of traveling wave electrodes. In certain versions, the substrate or substrate layer used in each layer of the array is formed from glass. The separating layer can be formed from a variety of materials such as nearly any etchable material, however, silicon and one or more polymeric materials are noted. In certain versions, the layered array uses four layers and thus provides four generally parallel channels through which various populations or types of particles may be transported by the traveling wave grids. In certain embodiments, each of the traveling wave grids is individually controllable relative to the other traveling wave grids. However, the exemplary embodiment includes versions in which two or more, or all, of the traveling wave grids are collectively operated. In certain versions, the layered array may further define a gas channel adapted for flow of a gas therethrough. The channel is generally in flow communication with each of the channels defined by the separating layer. In this version, a gas flowing through the gas channel tends to entrain or otherwise draw particles from their respective channels into the gas channel.

In many of the exemplary embodiments described herein, the layered or stacked array may further be used in conjunction with a collector grid generally disposed alongside the array. The collector grid includes a support material and a traveling wave grid that extends along at least a portion of the collector grid. The collector grid also defines a collector channel, generally formed within the support material. In certain configurations, the collector channel can extend transversely to the channels defined in the separating layers of the array. In this strategy, the channels defined in the separating layer may extend horizontally and the collector channel may extend vertically. The channels defined in the separating layers may either extend parallel with each other, as previously noted, or may extend in a non-parallel fashion. In yet another version of the layered or stacked array of the exemplary embodiment, the channels defined in the separating layers extend to an intersection region at which is disposed a collection of traveling wave electrodes. This intersection region may be in the form of the region previously described in conjunction with FIG. 1.

Figure 8:
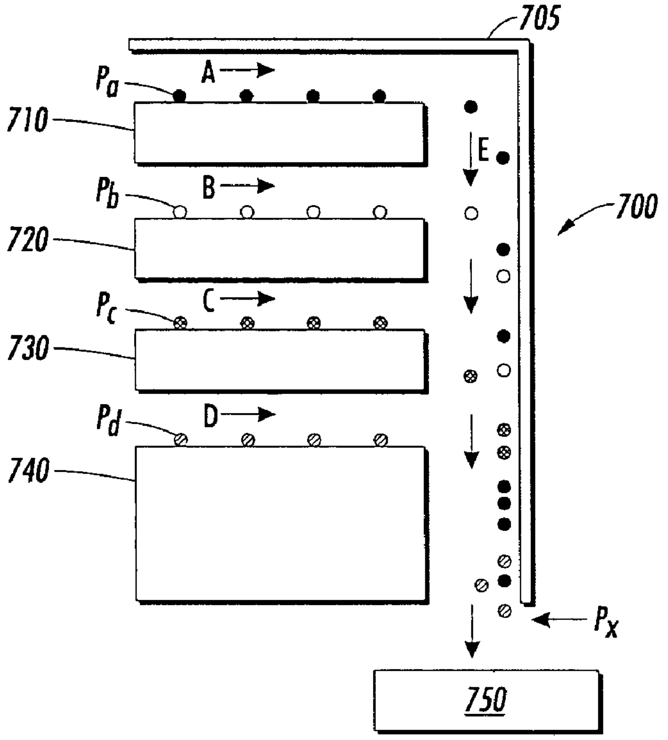
FIG. 8 is a schematic illustration of an exemplary embodiment particle transport system for premixing different types of particles prior to delivery.
Figure 9:
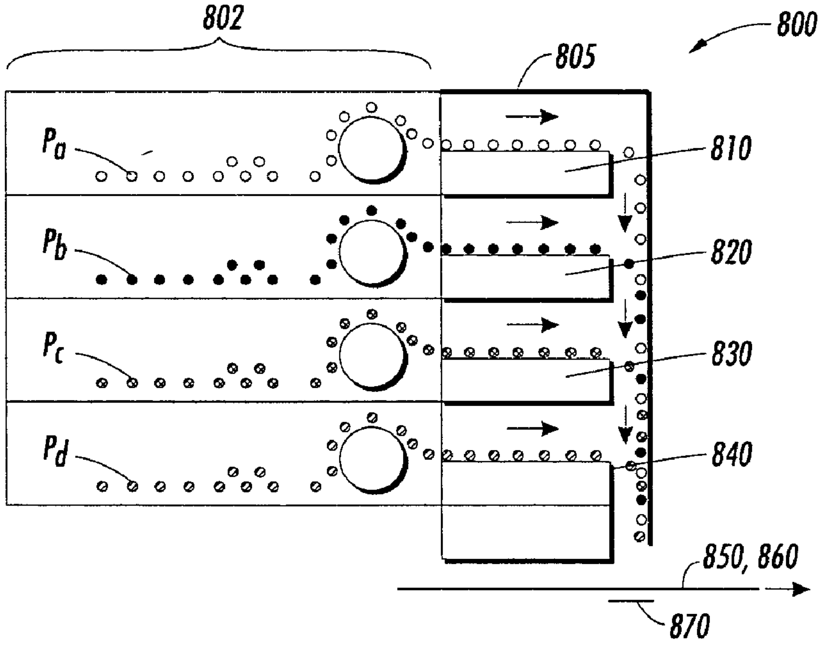
FIG. 9 is a schematic illustration of another exemplary embodiment particle transport system for premixing different types of particles prior to delivery.

The use of traveling wave grids to premix different types of particulates before delivering them at high spatial and temporal resolution to a substrate or other target is shown in FIGS. 8 and 9. FIG. 8 is a schematic of a pre-mixing unit 700 disposed within a housing 705 using traveling wave grids. Four different streams or different types of particulates $P_a$, $P_b$, $P_c$, and $P_d$ are fed to the unit 700 from the left. Individual addressable traveling wave grids 710, 720, 730, and 740 control when and how many particulates are moved onto a collector grid 750. Each of these traveling wave grids extend within a channel defined in the housing and extend between an entrance and an exit. Traveling wave grid 710 transports particles $P_a$ in the direction of arrow A to a distal end of the grid 710 at which the particles are gravity fed to the collector grid 750. Traveling wave grid 720 transports particles $P_b$ in the direction of arrow B to a distal end of the grid 720 at which the particles are gravity fed to the collector grid 750. Traveling wave grid 730 transports particles $P_c$ to a distal end of the grid 730 at which the particles are gravity fed to the collector grid 750. And, similarly, traveling wave grid 740 transports particles $P_d$ in the direction of arrow D to a distal end of the grid 740 at which the particles are gravity fed to the collector grid 750. The cumulative collection of particles in the feed stream E and/or on the collector grid 750 is denoted as $P_x$. Instead of gravity forces one can equivalently use alternative means such as another traveling wave grid in the wall 705, or a gas flow in the direction of the arrows.

In FIG. 9, individually operated traveling wave grids are used to obtain or gather small amounts of particulates from a reservoir on demand, such as controlled electronically, and deliver them at the desired time to a collector grid, such that the different types of particulates premix. This mixture of particulates is then delivered as one complete packet in a single step to the substrate. Specifically, FIG. 9 is a schematic of a system 800 to integrate a pre-mixing unit 805 with a current color printer. Toner is fed from a conventional developer system 802 onto traveling wave grids 810, 820, 830, and 840 for pre-mixing and gating of populations of particles $P_a$, $P_b$, $P_c$, and $P_d$. The pre-mixed particle packets are then transported either directly onto paper 850 to form a pixel, or onto a transfer belt 860, or into a gas stream that deposits them onto a target location. A transfer electrode 870 can be utilized to facilitate deposition onto the paper 850 or belt 860. Specifically, particles $P_a$ from developer system 802 are transported by a traveling wave grid 810 to a feed stream which is directed to a destination source such as paper 850 or a transfer belt 860. Particles $P_b$ from the developer system 802 are transferred from the traveling wave grid. 820 to the feed stream as previously noted. Similarly, particles $P_c$ from the developer system 802 are transferred by the traveling wave grid 830 to the noted feed stream. And, particles $P_d$ are transferred by the traveling wave grid 840 to the feed stream.

The use of traveling wave grids bridges the gap between relatively large or macroscopic particulate reservoirs and a relatively small or microscopic gating mechanism in a gradual manner by controlling the amount of particulates moved from one side to the other. It also reduces the risk of clogging due to particulates of an undesired charge or due to macroscopic foreign objects. Furthermore, traveling wave grids transport particulates independent of the sign of their charge in the same direction. Traveling wave grids do not move particles that are much larger than the electrode spacing and so, a filtering function can be achieved. The use of traveling wave grids provides full electronic control for premixing of various different types of particulates needed for each pixel, thereby reducing the needs for expensive registration systems necessary to align pixels of different particulate types (e.g. colors) on top of or next to each other.

In particular, for printing systems, a premixing unit such as 700 or 805 in FIGS. 8 and 9, respectively, replaces a conventional and otherwise required optical system needed to write an image on a photoreceptor, as well as the photoreceptor itself. Instead, the image is reduced to electrical signals that either move the required amount of toner into the premixing unit at the correct or desired time, or prevent toner from entering the premixing unit. This reduces the mechanical and optical complexity of current color printers, which either use a separate photoreceptor for each of the colors, or use a single photoreceptor and print the different colors in consecutive steps. In both cases, expensive registration systems are needed to align the different color images precisely on top of each other. These registration systems are not necessary if a premix unit such as units 700 or 805 is utilized, because the whole image is printed in a single step.

The delivery of different colored particulates or different particle populations or types, from one or more macroscopic particulate reservoirs via a collector grid enables very efficient premixing of only the required amount of each colored toner per pixel. Uniform particulate mixing of two or more colorants is achieved at a pixel-by-pixel level prior to imaging on a substrate. This is in contrast to typical image-on-image (IOI) color xerographic development where layers of each colored toner are laid down one-on top of each other. There is no premixing prior to the toner contacting the substrate surface. During the toner fusing process of heat and pressure, the different colored toner particles flow into each other to give a final, blended colored image. Premixing of small amounts of colored toner in the collector grid enables more uniform homogeneously blended colored images and a wider color gamut since toner blending is more finely controlled.

The present exemplary embodiment also enables the use of one constantly running traveling wave grid to collect all the toner particles and deliver to an output device. The exemplary embodiment also enables the use of several, e.g. typically four for black, cyan, magenta, and yellow toner, individual switchable traveling wave grids to deliver toner particles of a given color on demand to a collector traveling wave grid. Furthermore, the present exemplary embodiment enables the use of macroscopic traveling wave grids to connect one or more macroscopic particulate reservoirs to one or more microscopic gating traveling wave grids. Additionally, by use of the exemplary embodiment, traveling wave grids allow net-neutral toner to be used. Moreover, toner can be mixed on a pixel by pixel scheme.

By selecting the order of application or administration of different color supplies as well as fine-tuning the timing when each of the different color supplies adds toner to a pixel, small differences in net-charge and/or mobility of the different colored toners can be compensated for. This is an advantage over premixing toner in a fluidized bed, where mixing is done in bulk and requires equivalent charging properties and size distributions of the different colored toners to result in a homogeneous mixing.

Traveling wave grid technology is easily scaled down into integrated circuit dimensions, suggesting the use of this technology to powder printing schemes that are already based on integrated circuit/MEMS design, for example in ballistic aerosol marking (BAM) applications. Details and information relating to ballistic aerosol marking systems, components, and processes are described in the following U.S. Pat. Nos. 6,751,865; 6,719,399; 6,598,954; 6,523,928; 6,521,297; 6,511,149; 6,467,871; 6,467,862; 6,454,384; 6,439,711; 6,416,159; 6,416,158; 6,340,216; 6,328,409; 6,293,659; and 6,116,718; all of which are hereby incorporated by reference.

In accordance with the exemplary embodiment, the final print engine is completely independent of the actual number of different color toners used. This is in contrast to color laser printers, where there either is a separate photoreceptor plus an optical system, etc. for each color, or there is a single such system, but used in multiple steps to complete a color image.

Additionally, in accordance with the exemplary embodiment, the output color for each pixel can be controlled completely electronically. Accordingly, there is no need to optimize mechanical systems to obtain required color registration.

The strategies and techniques according to the exemplary embodiment are not limited to premixing color toners in a printing engine, but can be used to premix any other powders that can be moved by traveling wave grids, before delivering the mixture to one or more substrates or output receivers such as a liquid. An example of this application is in the mixing of pharmaceutical powders.

In accordance with the exemplary embodiment, there are many ways to combine several traveling wave grids so as to allow mixing different colored toners or particles. However, in order to use traveling wave grids to mix toner on a pixel-by-pixel base for a high-resolution printer (300 dpi or more) there are several space constraints, as follows.

In order to keep the toner for individual pixels focused on the selected track or path, it is in certain applications necessary to separate the individual tracks by side walls. To avoid separation of the different toners on the collector grid (due to different size, size distribution, net charge, interaction with a traveling wave grid surface, etc.), it is desirable to keep the length of the grid as short as possible. These dimensional constraints on the particulate channels as well as on the driving electronic circuitry suggest a lithographic based manufacturing process for the premixing unit. The following manufacturing methods are specifically included in the exemplary embodiment.

Figure 10:
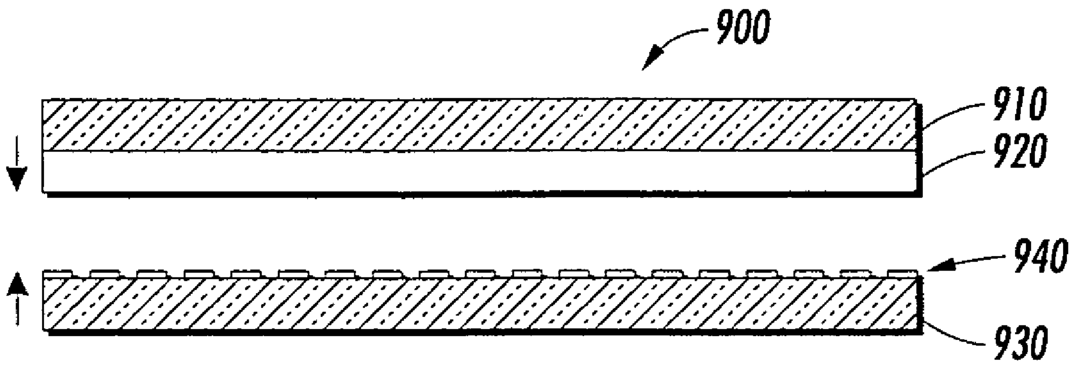
FIG. 10 is a schematic exploded view illustrating the assembly of an exemplary embodiment traveling wave grid assembly.
Figure 11:
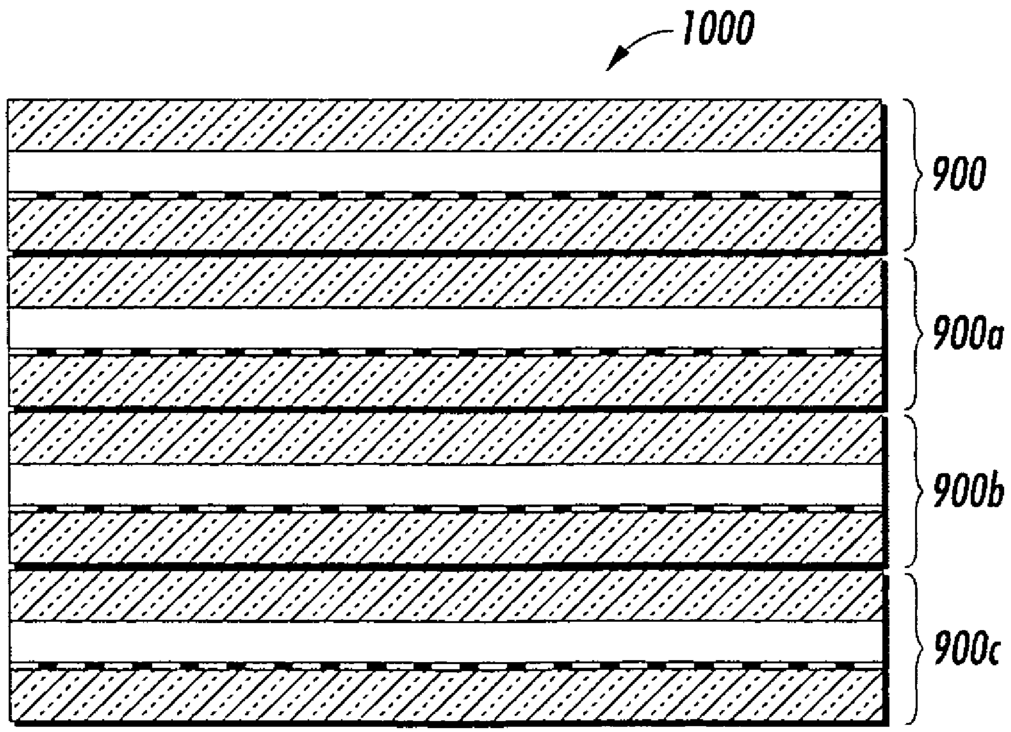
FIG. 11 is a schematic illustration of a collection of stacked traveling wave grids configured to distribute different types or populations of particles.
Figure 12:
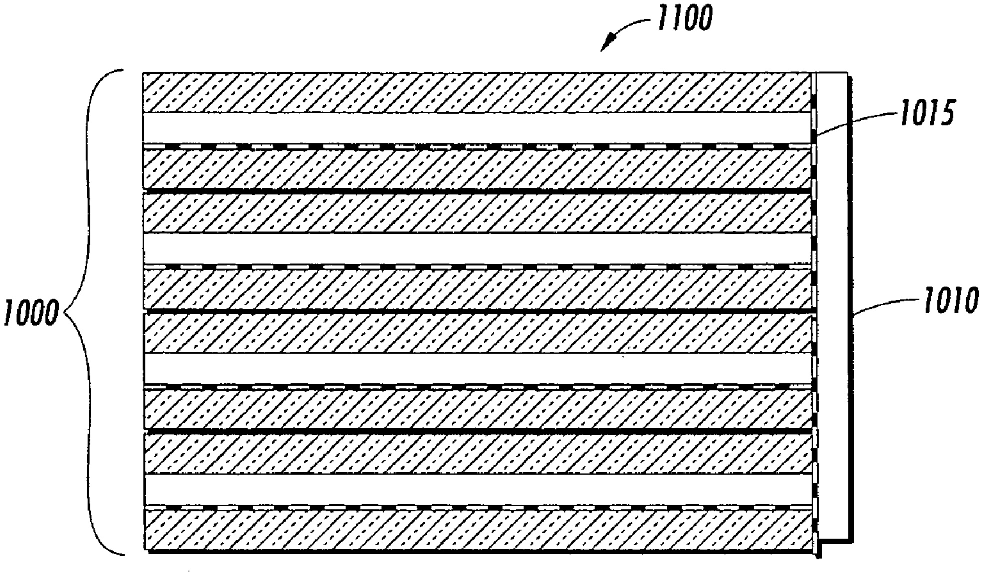
FIG. 12 is a schematic illustration of the stacked collection of traveling wave grids in FIG. 11 interfaced with a collector grid.
Figure 13:
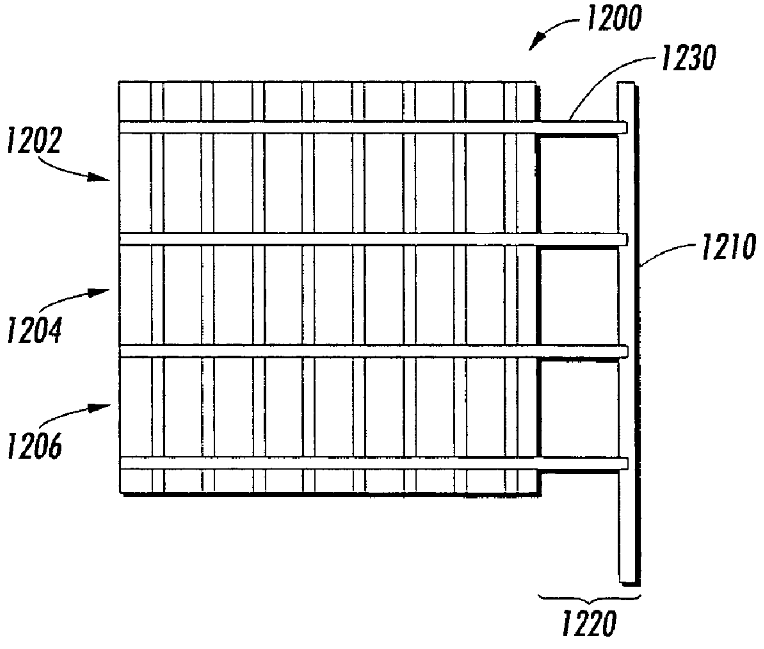
FIG. 13 is a schematic illustration of another exemplary embodiment system for transporting a collection of particles, or different types of particles.

60 μm wide channels with an 84 μm pitch can be manufactured on silicon wafers. Matching traveling wave grids on glass substrates have been built and tested successfully. FIG. 10 shows a layered array 900 including one Si wafer 910 defining a plurality of channels in region 920, and one glass wafer 930 with a traveling wave grid 940 disposed thereon. The assemblies are bonded together to form traveling wave driven supply channels. It will be appreciated that in the version depicted in FIG. 10, channeled region 920 is also formed within Si, like region 910. Four of these units can then be bonded together to form a four layered array 1000, as shown in FIG. 11. The array 1000 includes a plurality, and specifically four, of the previously described arrays 900, shown in FIG. 11 as 900, 900*a*, 900*b*, and 900*c*. This unit 1000 can then be mounted to a collector grid 1010 as shown in FIG. 12 to form a distribution device 1100. The grid 1010 includes one or more traveling wave grids 1015. To preserve the individual channels on the collector grid 1010, channel wide teeth can be etched out of the sides of the Si wafer and glass substrate sandwich. Specifically, as shown in FIG. 13, a schematic illustration depicts a system 1200 comprising individual supply channels 1202, 1204, and 1206 extending in a parallel fashion with one or more Si substrates 1230. One or more channels 1202, 1204, and/or 1206 provide communication with one or more vertical channels 1220. The vertical channels 1220 extend along a collector grid 1210.

Instead of using traveling wave grids on a glass substrate, a Si wafer could be utilized as substrate without changing the overall design as shown in FIGS. 10-13. And thus, a glass layer or substrate could be eliminated.

Figure 14:
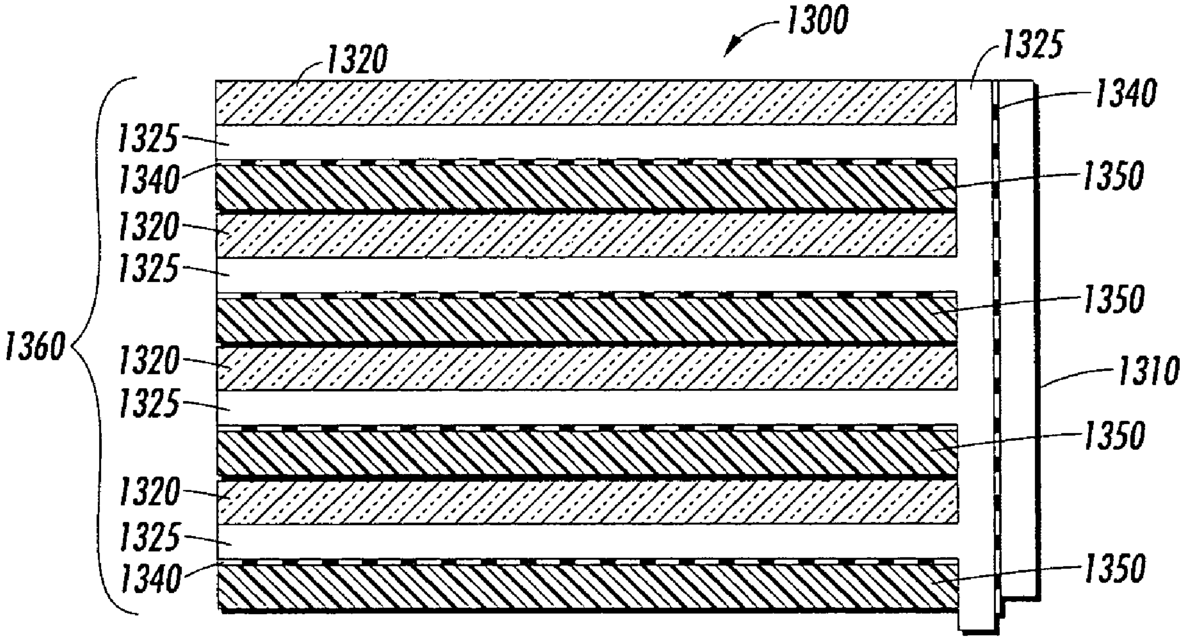
FIG. 14 is a schematic illustration of another exemplary embodiment of stacked traveling wave grids using polymeric layers, the collection being interfaced with a collector grid.

A second strategy in accordance with the exemplary embodiment is to still use glass/Si substrates for the traveling wave grids, but use an etchable polymer sheet to form the channel walls such as SU-8 as known in the art. In this case the walls on the collector grid can be manufactured directly by first laminating a polymer sheet on the collector grid, then etching the channels into the sheet, before combining it with the supply stack. This is illustrated in FIG. 14. FIG. 14 depicts a system 1300 including a collection of stacked arrays, each array comprising components or layers 1320, 1325, 1340, and 1350. The polymer film or layer is shown as 1320. A region of that film or polymer which defines a collection of channels is shown as region or layer 1325. A traveling wave grid is denoted as 1340. And a glass or Si substrate is shown as 1350. The resulting stacked assembly 1360 is adjoined to a collector grid 1310. The grid 1310 can include an etchable polymeric layer (not shown) that defines one or more channels 1325. The grid 1310 includes one or more traveling wave grids 1340.

Figure 15:
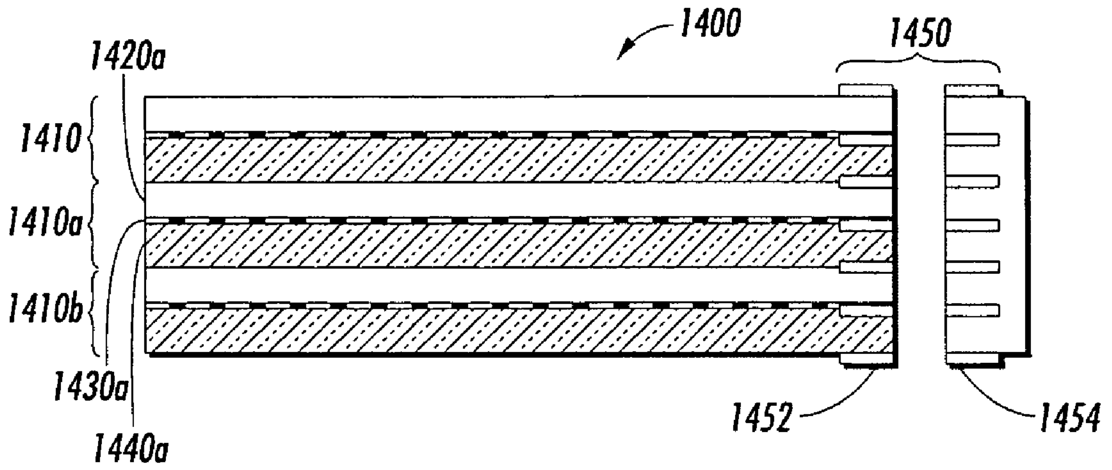
FIG. 15 is a schematic illustration of another exemplary embodiment of stacked traveling wave grids interfaced with a collector grid.
Figure 16:
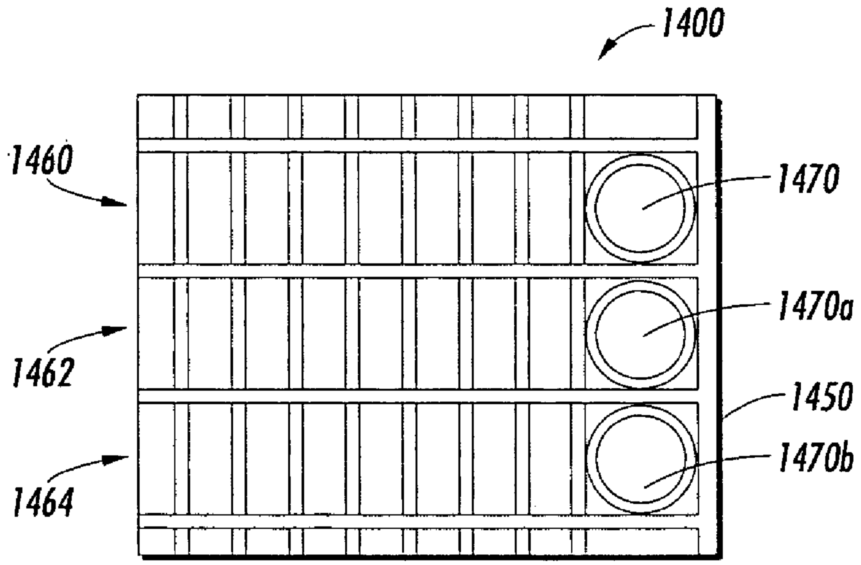
FIG. 16 is a top schematic view of the system depicted in FIG. 15.
Figure 17:
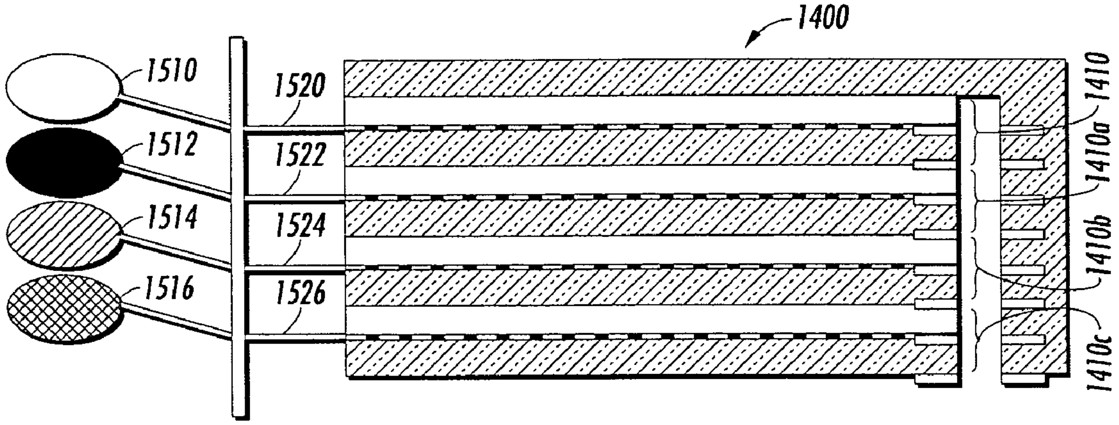
FIG. 17 is a schematic illustration of the system shown in FIGS. 15 and 16 integrated with a multi-reservoir system.

A third approach in accordance with the exemplary embodiment as shown in FIGS. 15-18 is to use a flex (printed circuit) board design to build the toner supply stack. A bottom layer with fine pitched patterned electrodes is laminated to an insulating layer that is patterned to provide channels, if desired, and to hold apart a top layer with optionally similar electrodes to those on the bottom layer. An enhancement of the structure is a vertical traveling wave grid that connects the different layers of this stack (FIGS. 15, 16). In FIGS. 15-18, a similar structure is used as in FIGS. 10-13, but manufactured using flex board technology. Here, vertical toner movers, one for each channel, replace the collector grid. The flex boards are easily extended into or towards the macroscopic toner reservoirs using their flexibility. This approach has the advantage that the whole supply stack including the collector grid can be manufactured in one multi-step process without the necessity to mechanically assemble different micro-machined parts after they have been completed independently. Using flex board technology also allows the reduction in the size of the supply stack since insulating layers can be as thin as 25 μm, but easily expandable to macroscopic dimensions for connection to the toner supply units (FIG. 17).

Specifically, FIG. 15 depicts a system 1400 comprising a plurality of layered arrays 1410, 1410*a*, and 1410*b*. Each layered array, such as array 1410*a* can be designated for one type of powder, particle, or population of particles. For example, array 1410*a* includes a polymeric film 1420*a* defining a plurality of deep etched channels, a traveling wave grid 1430*a*, and an insulating layer 1440*a*. A vertically disposed traveling wave grid 1450 is disposed at a location within the system 1400. The grid 1450 defines one or more channels through which particles can be transported by electrodes 1452 and 1454 of the grid 1450.

FIG. 16 is a top schematic view of the system 1400 shown in FIG. 15. Individual supply channels 1460, 1462, and 1464 can be seen, that provide a path or conduit for passage of the particles, toward a transversely positioned traveling wave grid 1450. Distinct passageways 1470, 1470*a*, and 1470*b* can be provided, e.g. by etching, or mechanical or laser drilling, to maintain segregation or isolation between particle flows.

FIG. 17 depicts the system 1400 integrated with a multi-reservoir system. Each of the individual layered arrays of the system 1400 is fed by a distinct and separate reservoir. Specifically, array 1410 is fed from reservoir 1510 which is in communication with the array 1410 by feed line 1520. Array 1410*a* is fed from reservoir 1512 by feed line 1522. Array 1410*b* is fed by reservoir 1514 through feed line 1524. And, array 1410*c* is fed by reservoir 1516 by feed line 1526.

Figure 18:
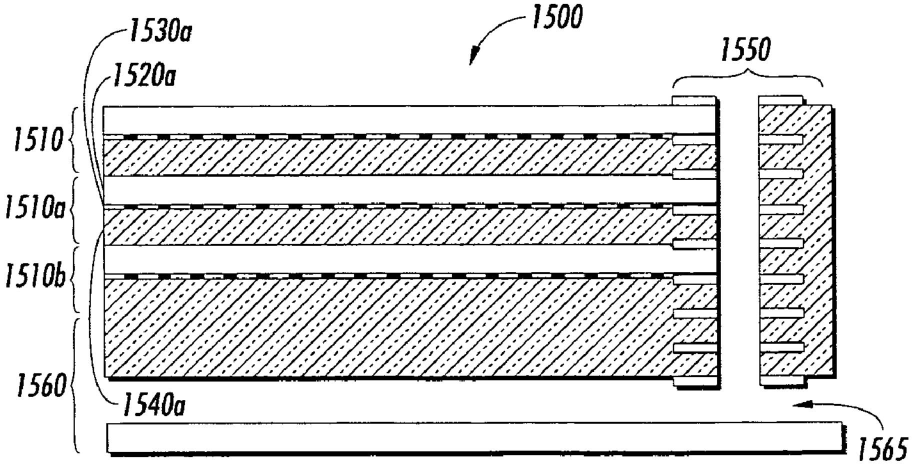
FIG. 18 is a schematic illustration of another exemplary embodiment system for transporting particles.

Depending upon the application, the configuration of FIG. 17 may be easily integrated into a conventional BAM printhead, where a flex board cover of a primary gas channel with vertical traveling wave grids as toner inlets is used as the gating design choice. In the configurations of FIGS. 15 and 16, the premix unit should be mechanically aligned to the BAM print head, while for the approach in FIG. 17 the premix unit is simply laminated on top of the cover flex board with proper alignment with the toner inlets. In fact, the entire flex board structure can be processed in one step and than laminated on top of the Si-etched BAM channels. Specifically, as shown in FIG. 18, a system 1500 is provided that comprises a plurality of layered arrays 1510, 1510*a*, and 1510*b*. Each layered array includes a polymeric film, such as 1520*a*, which defines a plurality of deep etched channels, and traveling wave grid 1530*a*, and an insulating layer 1540*a*. The system 1500 further comprises a vertically disposed traveling wave grid 1550 located at one end or region of the plurality of layered arrays. Disposed along another region of the plurality of layered arrays is a ballistic aerosol marking (BAM) device 1560 defining a passageway 1565 for transport of particles. Gas flow through the passageway 1565 draws particles from the traveling wave grid 1550 into the passageway, for subsequent delivery to another component or application to a surface.

Using the exemplary embodiments, color control can be completely maintained electronically and requires only conventional electric controls to achieve high standards and print quality. To avoid clogging of the narrow, pixel-wide channels it is desirable to keep the toner moving at all times without ever stopping inside the channels. To keep the number of individually addressable traveling wave grids at a minimum the following gating scheme is contemplated.

Figure 19:
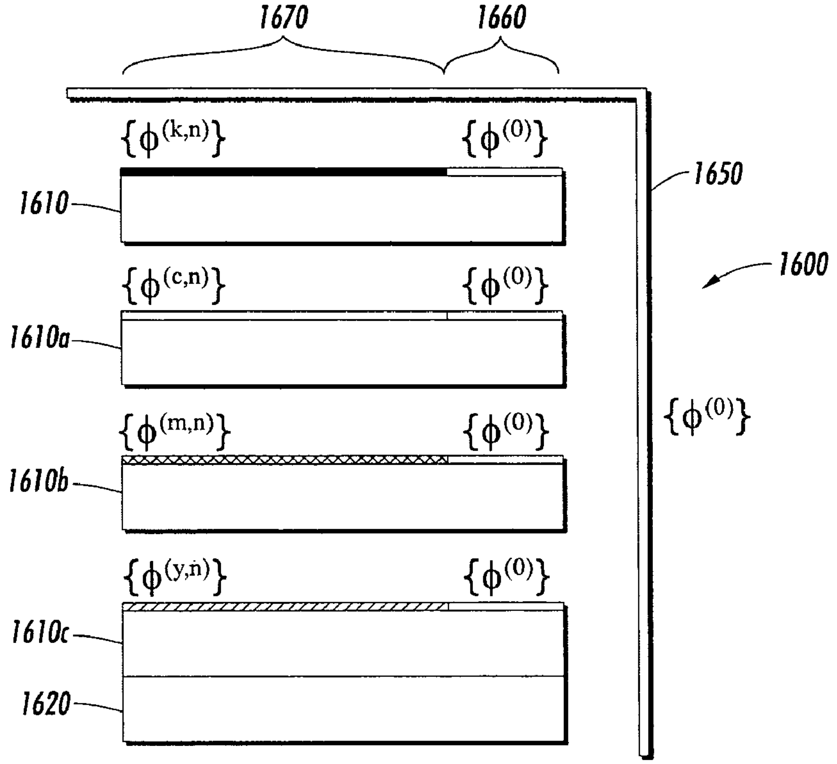
FIG. 19 is a schematic illustration of another exemplary embodiment system for transporting particles.
Figure 20:
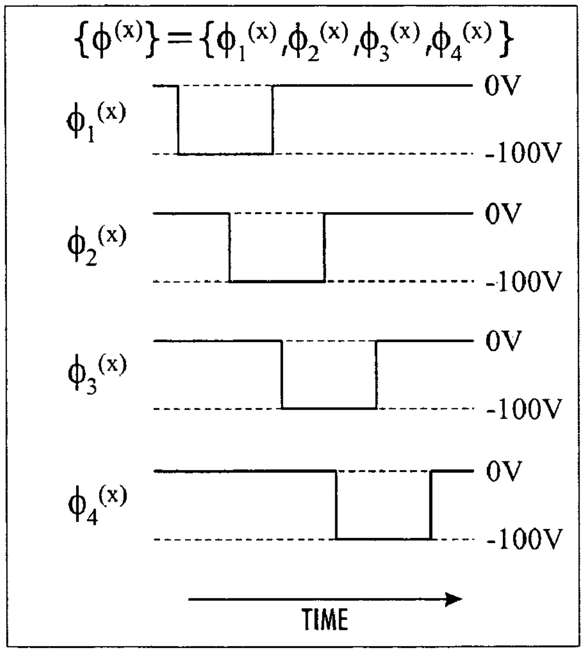
FIG. 20 is an illustration of a voltage waveform that can be used in the system shown in FIG. 19.

The collector grid is provided and configured to operate continuously with all channels in phase. In certain applications, a single, printhead-wide collector traveling wave grid can be used for the entire print head. To prevent toner from leaking from the collector grid into any of the supply channels, it is also desirable to keep the end of each supply channel constantly running as if it would supply toner to the collector grid. Both, the collector grid and the end sections of each of the individual toner supply channels receive the input signal $\{\Phi^{(0)}\}$ as shown in FIG. 19. Specifically, in FIG. 19, a schematic is shown of a collection of individual traveling wave grids used for pre-mixing individual pixels. A system 1600 is provided that includes a collection of individual arrays 1610, 1610*a*, 1610*b*, and 1610*c* disposed on a substrate 1620; and a collector grid 1650. The collector grid 1650 and a short section of traveling wave grids 1660 (next to the collector) of each of the arrays are running all the time in order to move toner particles to a target via signal $\{\Phi^{(0)}\}$ In the remaining section of each of the individual arrays, i.e. section 1670, is an individually addressable traveling wave grid, that can be switched between an "ON" state (moving toner towards the collector) and an "OFF" state (moving toner back towards the reservoir). FIG. 20 shows a typical pulse sequence for a four-phase traveling wave grid used in conjunction with the system of FIG. 19. The actual gating is achieved with individual traveling wave grids further up the individual toner supply channels. These would be switched from an "OFF" state, where toner is moved from the channels back into the reservoir, to an "ON" state, where toner is delivered to the collector grid, and back (signals $\{\Phi^{(x,n)}\}$, x=k,c,m,y in FIG. 19). With this design, for a desired number of individual channels, a corresponding number of independent traveling wave grid drivers are utilized, each with four input channels.

Since, in the present exemplary embodiment, the collector channels are vertically oriented and feed particulates into a main BAM channel from the top, a simple gravitational feed without the vertical toner mover, would also be possible. This gravitational feed could be promoted by additional air flow, e.g. suction, driven by a sub-atmospheric pressure region in the BAM channels at the particulate inlets. Sub-atmospheric pressure regions are achieved using a properly designed converging-diverging channel section. However, to control the toner flow in the collector channel precisely enough to guarantee consistent color mixing and high printing speed, additional vertical toner movers are advantageous.

All the methods that are described herein can employ the same strategy, where each of the supply traveling wave grids as well as the printhead is in a separate plane. These individual planes are stacked on top of each other and are connected through the collector grid. This configuration appears to be very efficient in building many equivalent input channels in parallel in as small a space as possible, as is required for a high resolution printer, for example.

Figure 21:
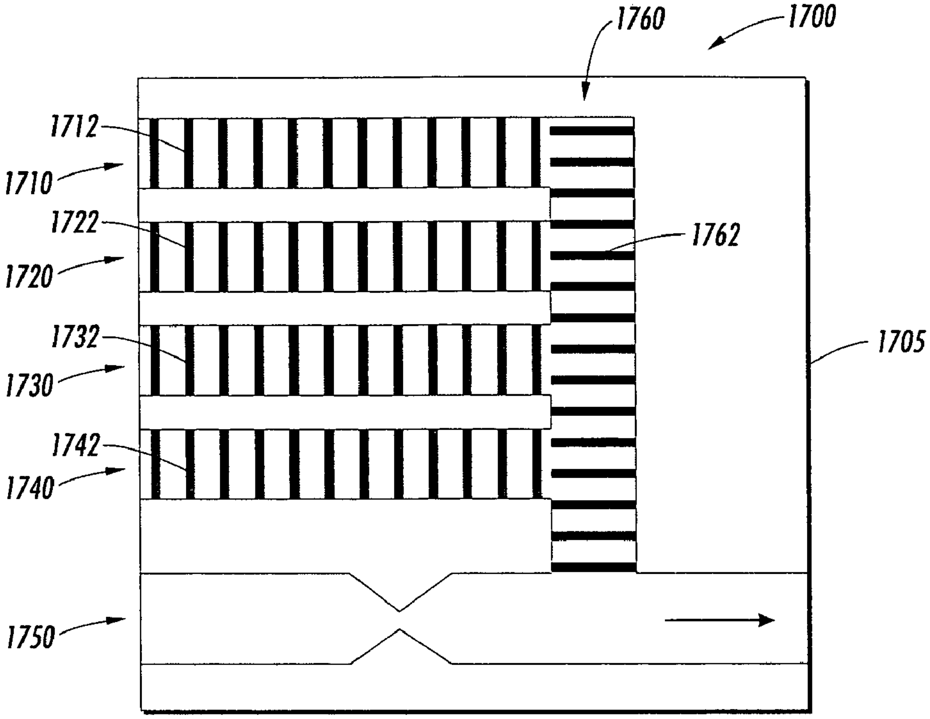
FIG. 21 is a schematic illustration of another exemplary embodiment system for transporting particles.
Figure 22:
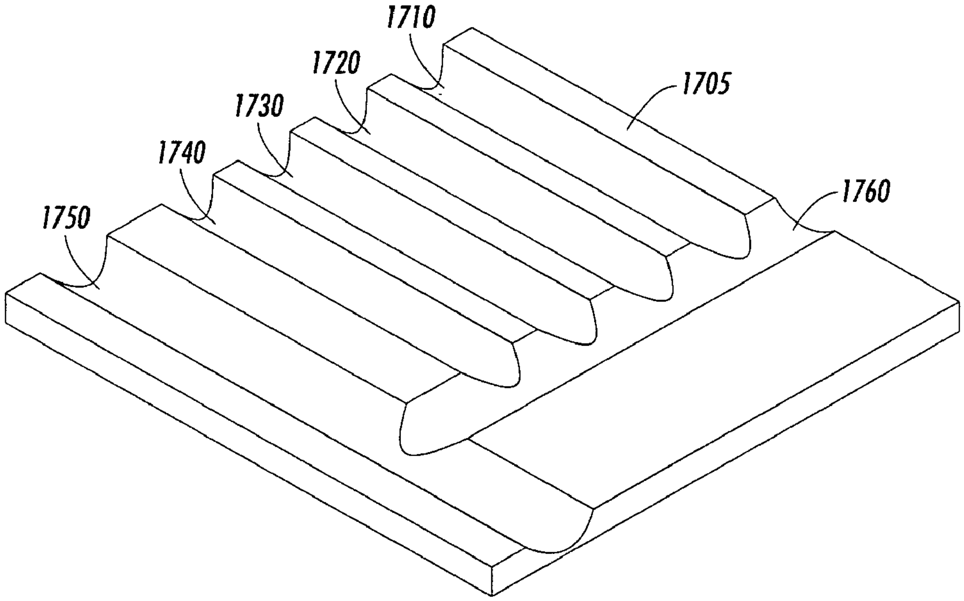
FIG. 22 is a schematic perspective illustration of a body used in the system of FIG. 21.

In an alternate embodiment, complete particulate supply channels are readily provided for a remixing/collector grid and a high-speed gas delivery channel in a single plane, such as shown in FIGS. 21 and 22. Specifically, a system 1700 is depicted comprising a plurality of feed channels 1710, 1720, 1730, and 1740. Within each channel, an individually addressable traveling wave guide is provided, e.g. 1712, 1722, 1732, and 1742. A transversely oriented collection channel 1760 is provided at one end of the plurality of feed channels, and a separately addressable traveling wave grid 1762 is provided proximate the channel 1760. A channel adapted for high speed gas flow 1750 is provided, to which the collection channel 1760 provides access. The various channels are all defined within a wall or body 1705.

Figure 23:
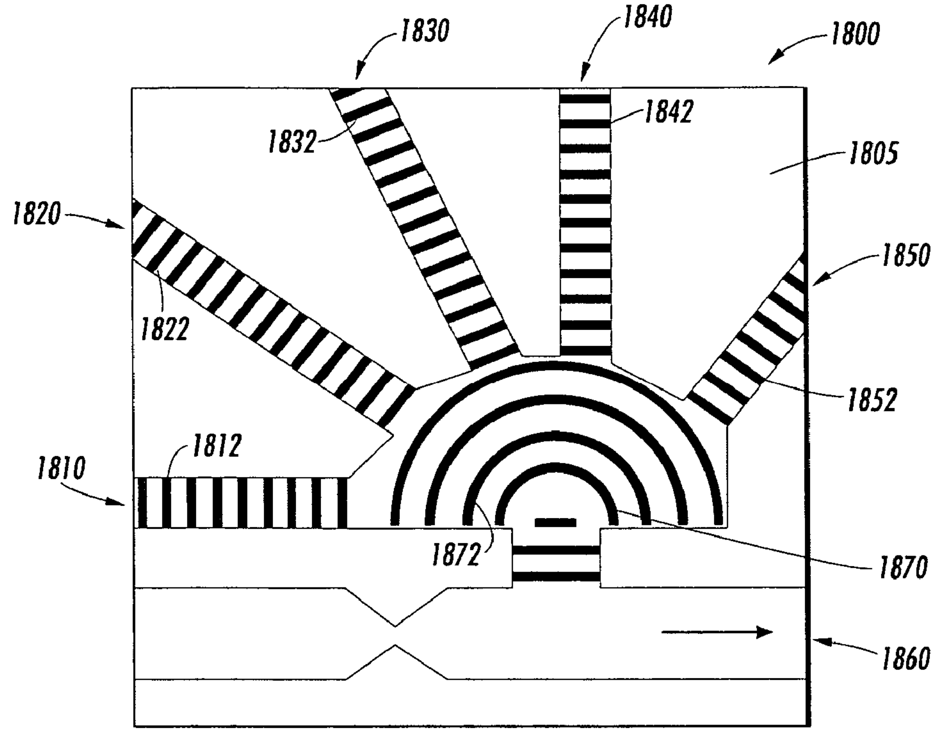
FIG. 23 is a schematic illustration of another exemplary embodiment system for transporting particles.

Depending on the desired application, it is possible to have as many particulate supply channels as desired, such as shown in FIG. 23. Referring to FIG. 23, a system 1800 is shown comprising a plurality of feed channels 1810, 1820, 1820, 1840, and 1850. Disposed within each channel is an individually addressable traveling wave grid. Specifically, disposed in channel 1810 is a traveling wave grid 1812. Disposed within the channel 1820 is another traveling wave grid 1822. Disposed within the channel 1830 is another traveling wave grid 1832. Disposed within the channel 1840 is a traveling wave grid 1842. Disposed within the channel 1850 is another traveling wave grid 1852. Each of the channels leads to a collection area 1870. An appropriately configured traveling wave grid 1872 spans the region of the collection area 1870. The system 1800 also includes a channel 1860 adapted for the high speed flow of a vapor or gas as previously described herein. All of the various noted channels and traveling wave grids are preferably provided within a body or module 1805.

FIG. 23 also illustrates the use of a collection of concentrically arranged arc electrodes in the area 1870. These electrodes and/or this type of configuration can be used in an intersection region such as described and shown in system 100 of FIG. 1.

Figure 24:
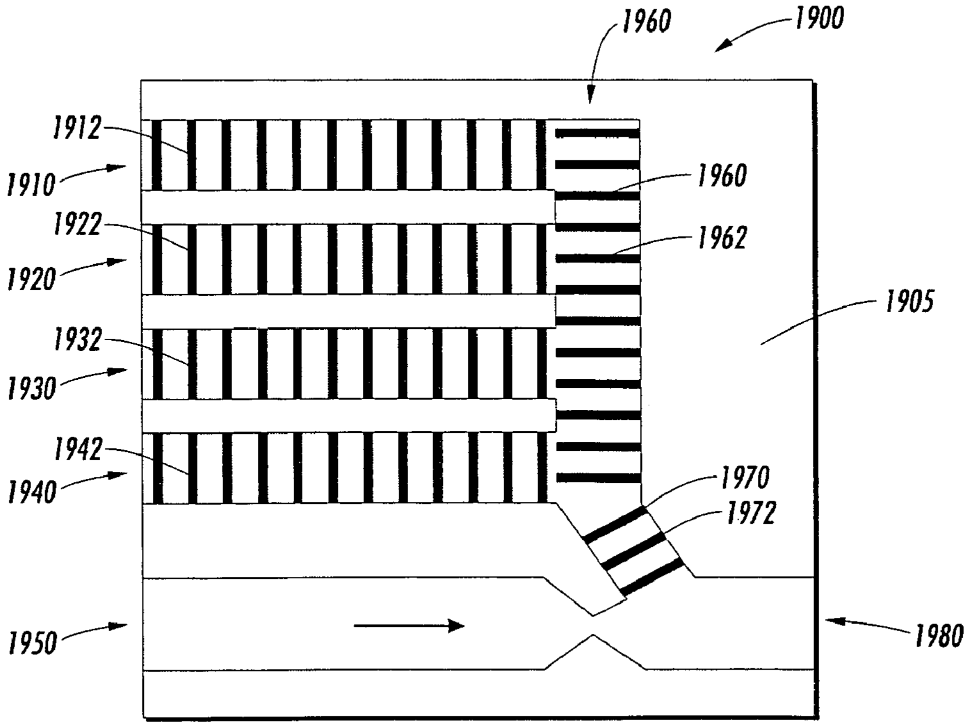
FIG. 24 is a schematic illustration of another exemplary embodiment system for transporting particles.

The present exemplary embodiment provides complete freedom as to the shape and dimensions of the gas channel, as well as on the connection of the particulate supply channel with the main gas channel (FIG. 24). FIG. 24 illustrates another system 1900 defining a plurality of feed channels 1910, 1920, 1930, and 1940. Disposed within each of the channels is an individually addressable traveling wave grid, i.e. traveling wave grids 1912, 1922, 1932, and 1942. Defined along one end or region of the plurality of feed channels is a collection channel 1960. It is also noted that an individually addressable traveling wave grid 1962 is provided within the collection channel 1960. A channel 1950 is provided for the high speed passage of air vapor or other gas to an exit 1980. One or more regions such as region 1970 provide communication between the collection channel 1960 and the exit 1980 or other region of the high pressure channel 1950. A traveling wave grid segment 1972 is disposed within the region 1970. All of the noted channels are defined or otherwise provided in a body or module 1905. This flexibility in design allows decoupling the gating of the particulates, which is done electrostatically, from efficiently accelerating, which is achieved through hydrodynamic forces.

Using again a flex board design, it is easy to extend the microscopic supply channels to macroscopic areas that readily communicate with macroscopic particulate supply units. Since these one-pixel printers are planar units with a height that can be as small as one pixel, many units can be laminated together, making this a very scalable high-resolution printer of any desired width.

Figure 25:
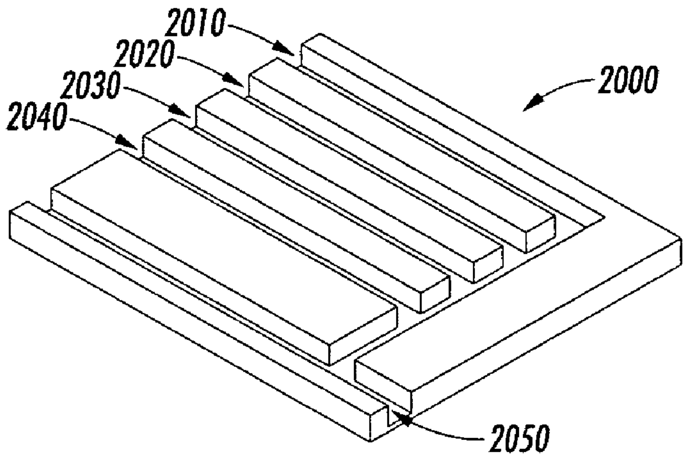
FIG. 25 is a schematic perspective view of an exemplary embodiment single layer component for use in a particle transport system.
Figure 26:
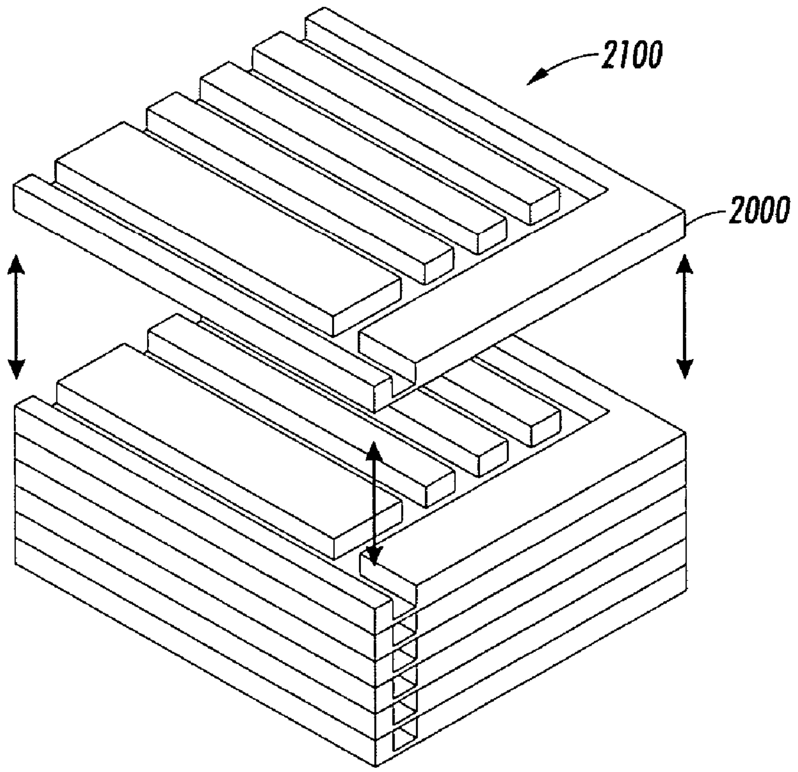
FIG. 26 is a schematic perspective view of another exemplary embodiment system using a collection of the layers depicted in FIG. 25.
Figure 27:
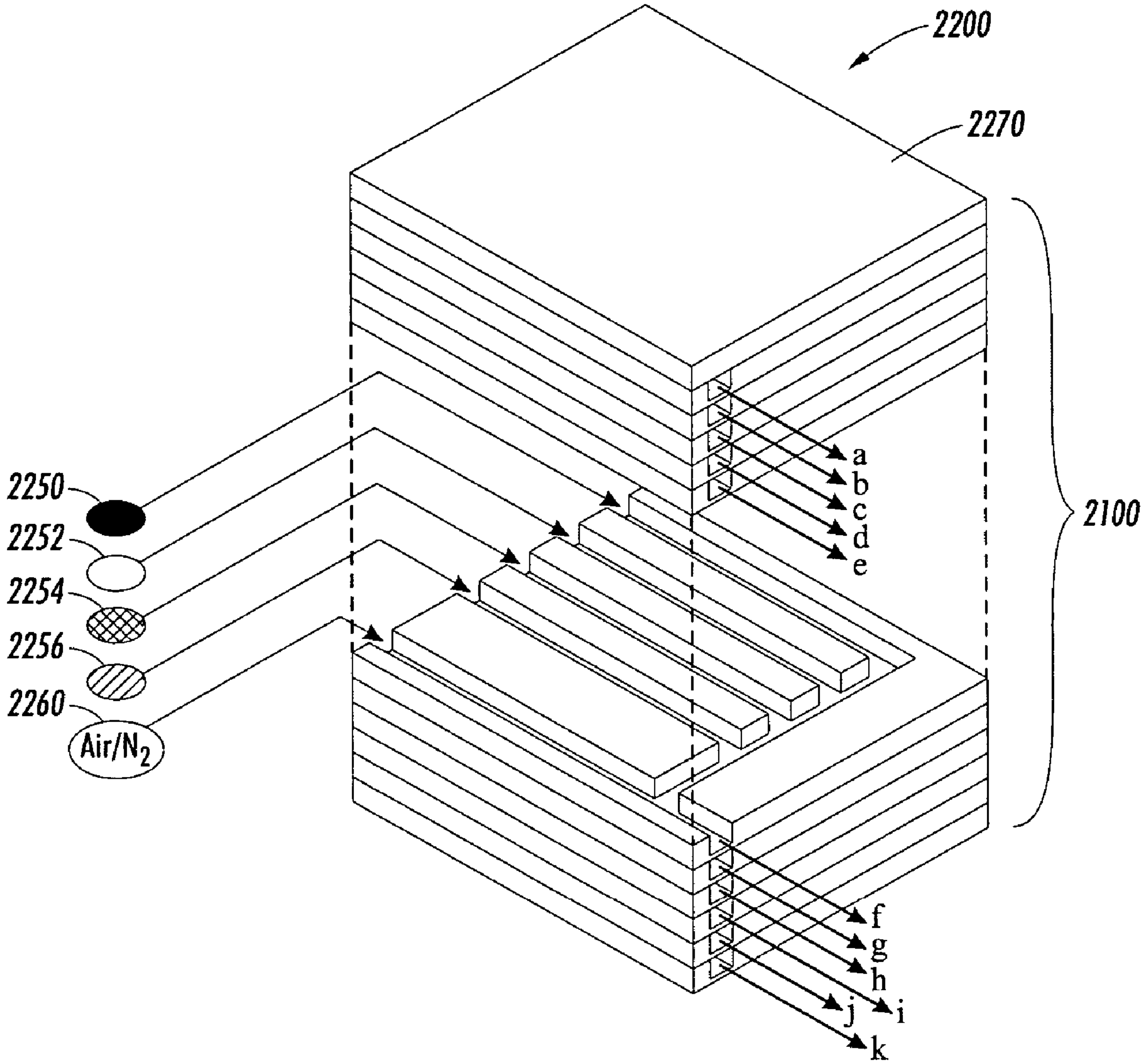
FIG. 27 is a schematic perspective view of the system shown in FIG. 26 and designation of various feed inlets and exit ports for particles.

With a BAM printhead, traveling wave grids can be aligned such that gravity either keeps the toner on the grid, or allows the toner to fall back into a reservoir or into another suitable area. Specifically, FIG. 25 illustrates an individual pixel "chip" 2000, similar in configuration to the structure depicted in FIG. 21. The chip 2000 defines a plurality of feed channels 2010, 2020, 2030, and 2040 that provide communication to a high pressure gas channel 2050. FIG. 26 illustrates a stacked configuration 2100 comprising a plurality of the chips 2000. FIG. 27 illustrates a system 2200 comprising the stacked configuration 2100 of FIG. 26 in which each feed channel of an individual chip, i.e. chip 2000, is in selected communication with one or more reservoirs such as reservoir 2250, 2252, 2254, and 2256. A supply 2260 of high pressure gas such as air or nitrogen can be provided in communication with the high pressure gas channel in one or more of the chips of the stacked configuration 2100. The output of each chip, e.g. a, b, d, d, e, f, g, h, i, j, and k, can be used for printing an array of pixels. A top layer 2270 can be provided to enclose the stacked configuration 2100.

Also provided is a structural embodiment of a three dimensional traveling wave grid array. The structure includes a stack of planes, layers, or sheets permeated by open vias. Instead of planar layers, non-planar layers or sheets can be utilized. The vias are voltage programmable and driven either directly or by a matrix addressing scheme. Each layer has associated spacers to allow stacking to achieve a three dimensional array. The spacers can be conducting to enable three dimensional matrix addressing.

Figure 28:
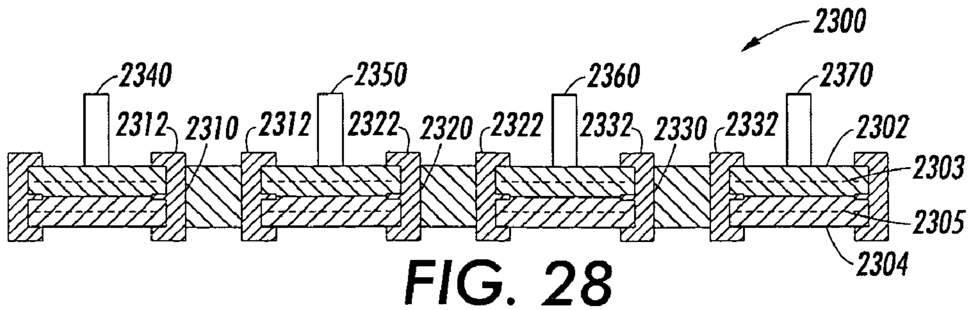
FIG. 28 is a schematic side elevational view of an exemplary embodiment via structure.

A structure is provided which enables a three dimensional electrode array in a physical matrix with an open space or region between all electrodes to allow field-activated passage of particles. FIG. 28 shows a schematic of one such embodiment. Specifically, FIG. 28 illustrates a side view of a plane of vias created in printed circuit board technology or other means. The through holes are plated and connected to a grid of shielded lines (dashed lines in FIG. 28). The vias can be connected to dedicated drivers, or can be charged by matrix addressing if cross point transistors are included. Amorphous silicon high voltage transistors embedded within PCB is one method for creating such switches. Standoffs are integrated in the processing. The standoffs can themselves form part of a shielded z-axis matrix addressing array.

Figure 29:
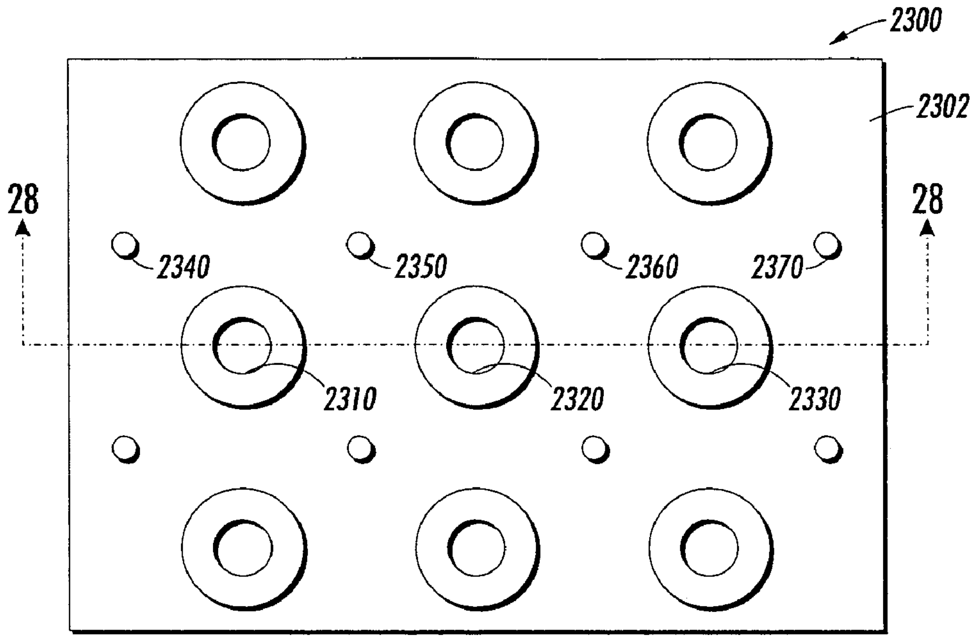
FIG. 29 is a schematic top view of the exemplary embodiment depicted in FIG. 28.

Specifically, FIG. 28 illustrates a side elevational view of an assembly 2300 comprising layers 2302 and 2304, each including respective electrical conductors 2303 and 2305. FIG. 29 is a top elevational view of the assembly 2300 shown in FIG. 28. It will be appreciated that arrays of traveling wave grids can be disposed within the planes 2302 and/or 2304. Such arrays of grids can be utilized to induce any desired motion of sample within the plane of the assembly. The layers 2302 and 2304 each define a plurality of transversely extending vias such as 2310, 2320, and 2330. The via 2310 includes a circular electrically conductive electrode 2312. The via 2320 includes a circular electrically conductive electrode 2322. And, the via 2330 includes a circular electrically conductive electrode 2332. The assembly 2300 also includes a plurality of spacers such as 2340, 2350, 2360, and 2370. As noted, in-plane electrical conductors 2303 and 2305 are used to provide electrical communication to the electrodes 2312, 2322, and 2332. The electrodes 2310, 2320, and 2330 are utilized to provide, when used in conjunction with at least one other assembly as described herein, a traveling wave grid or electrode array for transporting, sample or particles in a direction transverse to the plane of the assembly. The spacers or stand-offs such as 2340, 2350, 2360, and 2370 can also be electrically conductive and configured to provide an addressing array that is transversely oriented to the planes or layers 2303 and 2305. It will be understood that the spacers are optional. Adjacent layers can be spaced apart and affixed.

Figure 30:
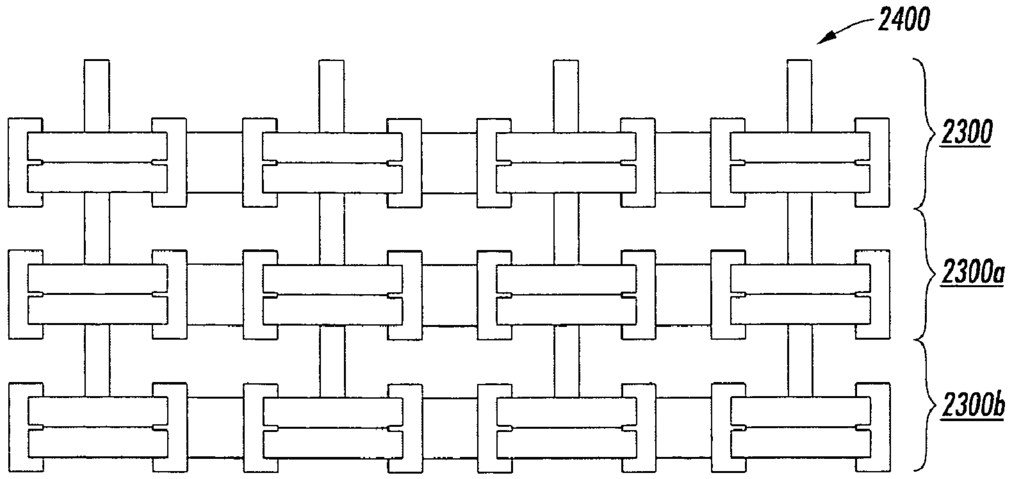
FIG. 30 is a schematic side elevational view of a collection of vias in an interconnected assembly.

FIG. 30 illustrates a stack 2400 of planar assemblies 2300, 2300*a*, and 2300*b* to create a three dimensional matrix providing a three dimensional array of independently addressable electrodes. Particles, either in a gas like air or in a liquid like water, can be moved through the interspaces in the potential wells of three dimensional waves created by applying appropriately phased voltages on the electrodes.

In accordance with the exemplary embodiment, by using a stack of one-pixel printers, it is now feasible to construct a vertical full-color printer of any size. Vertical printers can have a possible use in small offices where desk space is at premium, but a slim printer might fit between desks, workstations, etc.

In the various exemplary embodiments, the use of traveling wave grids is utilized to premix particulates before delivering them to a substrate. This strategy enables a much better color control in printing powdered toner, especially in connection with BAM technology. By integrating the particulate supply, premixing area, and high-speed gas channels onto a single chip, a highly scalable full-color, fully integrated one-pixel print head can be provided that can not only be used in many different printing applications, but is also very useful in delivering well-defined premixed powders to substrates with high resolution.

Figure 31:
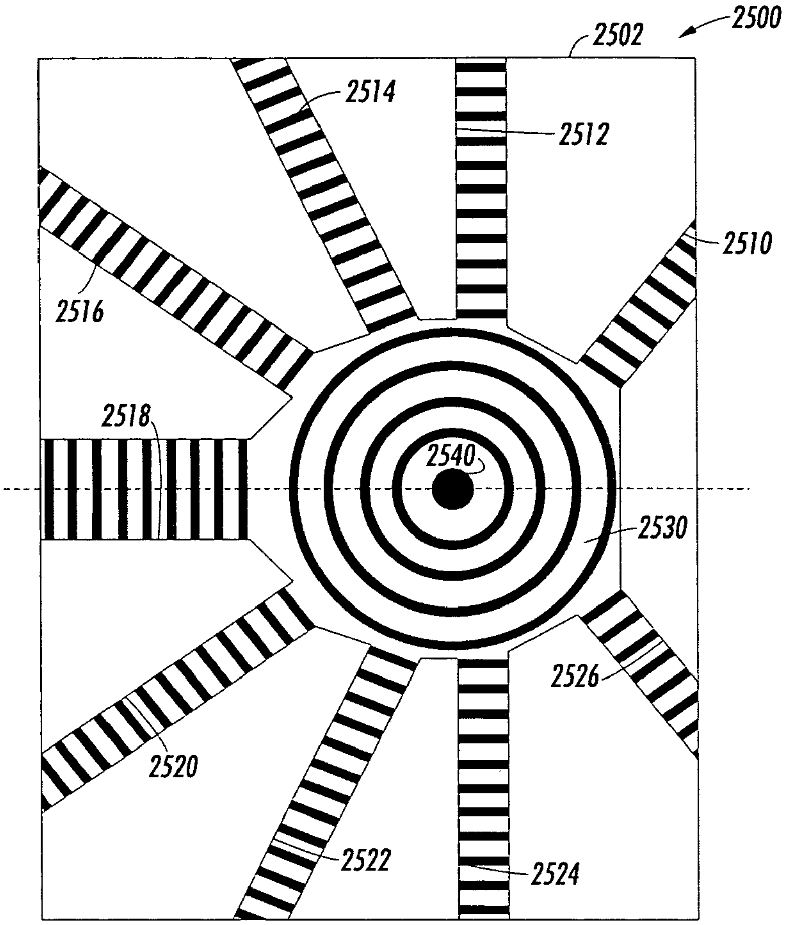
FIG. 31 is a schematic of a premixing system.

FIG. 31 is a schematic of an exemplary embodiment premixing assembly such as could be used in a pharmaceutical capsule manufacturing process. Specifically, FIG. 31 depicts an assembly 2500 comprising a body 2502 defining a plurality of supply channels, each extending to a central mixing region 2530. In the embodiment shown in FIG. 31, the body 2502 defines supply channels 2510, 2512, 2514, 2516, 2518, 2520, 2522, 2524, and 2526. Each of the channels includes a traveling wave grid. The mixing region 2530 includes an aperture which provides communication to a transversely oriented traveling wave grid 2540. Different populations of particulates, samples, or other feed ingredients can be fed to the various supply channels such as channels 2510, 2512, 2514 . . . etc. The traveling wave grid associated with each channel is selectively operated to transport particles introduced into the channels into the mixing region 2530. A plurality of concentrically arranged electrodes induces movement of particulates to the transversely oriented traveling wave grid 2540.

Figure 32:
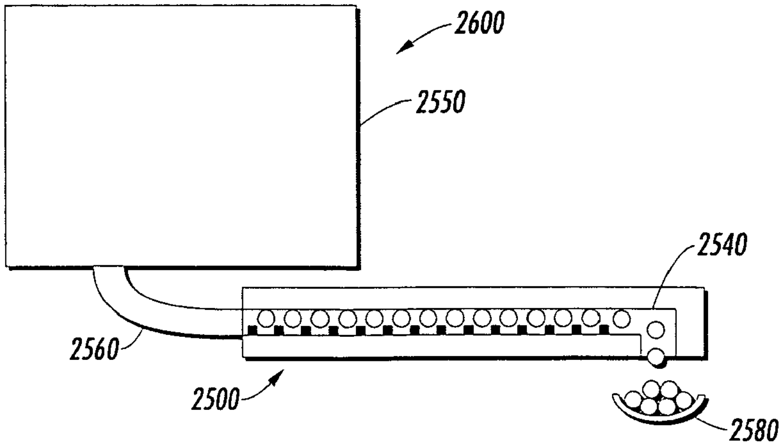
FIG. 32 is a schematic of the system depicted in FIG. 31 in conjunction with a reservoir and product collection area.

FIG. 32 schematically illustrates a system 2600 using the assembly 2500 in FIG. 31 to manufacture capsules or pills, such as in a pharmaceutical application. The assembly 2500 receives feed of particulates from one or more reservoirs, such as reservoir 2550. A feed channel 2560, which can also utilize a traveling wave grid, transports feed from the reservoir to a respective channel 2540 of the assembly 2500. The system 2600 can also utilize a product collection container 2580 to collect the capsules or pills produced from the assembly 2500.

Various methods are also provided for selective transport of particulates using the systems described herein. In a first exemplary embodiment, a method for selectively directing a particulate sample along one or more branches of a multi-branch traveling wave grid assembly is provided. The method comprises providing a multi-branch traveling wave grid assembly including (i) a substrate, (ii) a common electrode region disposed on the substrate, (iii) a plurality of traveling wave electrode grid branches extending from the common electrode region, and (iv) at least one electronic controller in electrical communication with the common electrode region and the plurality of traveling wave electrode grid branches and adapted to induce traveling waves on the common electrode region and the plurality of traveling wave electrode grid branches. The method also comprises a step of applying a particulate sample on at least one of the common electrode region and one or more branches of the plurality of traveling wave electrode grid branches. The method further comprises a step of selectively operating the at least one electronic controller to induce traveling waves upon select regions of the common electrode region and one or more branches of the traveling wave electrode grid branches. At least a portion of the particulate sample is selectively directed along one or more branches of the multi-branch traveling wave grid assembly.

In accordance with a further aspect of the present exemplary embodiment, a method for mixing different populations of particles in a multi-channel traveling wave grid assembly is provided. The assembly includes (i) a mixing region, (ii) a plurality of feed channels providing flow communication between a plurality of feed sources of different particle populations, each of the feed channels extending between the mixing region and a respective feed source and including a traveling wave grid, and (iii) an exit channel including a traveling wave grid, and (iv) an electronic controller in electrical communication with the traveling wave grids of the feed channel and the exit channel. The method comprises introducing a first population of particles to a first feed channel. The method also comprises introducing a second population of particles to a second feed channel. And, the method comprises operating the electronic controller to thereby induce (i) an electrostatic traveling wave along the traveling wave grid of the first feed channel and (ii) an electrostatic traveling wave along the traveling wave grid of the second feed channel, to thereby transport the first population of particles and the second population of particles to the mixing region at which the first and second populations of particles are mixed.

In accordance with another aspect of the present exemplary embodiment, a method for displacing a localized group of particulates across a region of an electrode grid is provided. The grid includes (i) a substrate, (ii) a plurality of electrodes disposed on the substrate, and (iii) an electrical controller in operative communication with the plurality of electrodes and adapted to actuate one or more select electrodes. The method comprises depositing a group of particulates on the plurality of electrodes. The method also comprises identifying a set of electrodes of the plurality of electrodes adjacent the group of particulates. And, the method comprises actuating the set of electrodes with the electrical controller to thereby displace the group of particulates.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A traveling wave grid assembly adapted for multiple dimensional transport of particulates, the assembly comprising:

a macroscopic particulate reservoir;

a substrate;

a plurality of individually addressable point electrodes disposed on the substrate;

a microscopic gating mechanism; and an electronic controller in communication with the electrodes and adapted to apply an electrical waveform to the electrodes and thereby produce a traveling wave along the substrate, wherein the electrical waveform is supplied to control the amount of particulates moved from the macroscopic particulate reservoir through the microscopic gating mechanism.

2. The traveling wave grid assembly of claim 1 wherein the electrodes are located substantially uniformly over the substrate.

3. The traveling wave grid assembly of claim 1 wherein the substrate defines a via extending through the substrate.

4. The traveling wave grid assembly of claim 1 wherein the controller is adapted to apply an electrical waveform that produces a traveling wave that moves along the substrate in two dimensions.

5. The traveling wave grid assembly of claim 1 wherein the microscopic gating mechanism is at least one microscopic gating traveling wave grid.

6. A traveling wave grid assembly adapted for multiple dimensional transport of particulates, the assembly comprising:

a substrate;

a plurality of individually addressable electrodes disposed on the substrate in an arrangement of rows and columns; and an electronic controller in communication with the electrodes and adapted to apply an electrical waveform to the electrodes to produce a traveling wave along the substrate, wherein an active part of the traveling wave grid is several rows and columns of electrodes larger than a group of the particulates to be moved.

7. The traveling wave grid assembly of claim 6 wherein the controller is adapted to apply an electrical waveform that produces a traveling wave that moves along the substrate in two dimensions.

8. The traveling wave grid assembly of claim 6, wherein there are at least two simultaneous active traveling wave grid portions to move at least two separate groupings of particulates.

9. The traveling wave grid assembly of claim 8, wherein particulates in a first grouping of particulates are different from particulates in a second grouping of particulates, of the at least two separate groupings of particulates.

10. A traveling wave grid assembly adapted for multiple dimensional transport of particulates, the assembly comprising:

a layered array including, a first substrate;

a second substrate;

a plurality of channels defined in the first substrate;

a plurality of individually addressable electrodes disposed on the second substrate, the first substrate and the second substrate in a bonded relationship, to form traveling wave driven supply channels; and an electronic controller in communication with the electrodes and adapted to apply an electrical waveform to the electrodes and thereby produce a traveling wave for the supply channels of the layered array.

11. The traveling wave grid assembly of claim 10, wherein the plurality of channels includes, at least a first channel and a second channel, each of the first and second channels defining an entrance and an exit, the exits of each of the first and second channels providing access to a common region also defined in the substrate.

12. The traveling wave grid assembly of claim 11, wherein the plurality of individually addressable electrodes includes, a first traveling wave grid extending within the first channel and in communication with the electronic controller; and a second traveling wave grid extending within the second channel and in communication with the electronic controller;

wherein upon operation of the electronic controller, at least one waveform is applied to the first and second traveling wave grids to thereby produce traveling waves along the first and second channels defined in the member.

13. The traveling wave grid assembly of claim 12 wherein the first and second channels extend parallel to one another.

14. The traveling wave grid assembly of claim 12 wherein the first and second channels extend non-parallel to one another.

15. A traveling wave grid assembly adapted for multiple dimensional transport of particulates, the assembly comprising:

a layered array including, a first substrate;

a second substrate;

a plurality of channels defined in the first substrate;

a plurality of individually addressable electrodes disposed on the second substrate, the first substrate and the second substrate in a bonded relationship, to form traveling wave driven supply channels; and an electronic controller in communication with the electrodes and adapted to apply an electrical waveform to the electrodes and thereby produce a traveling wave for the supply channels of the layered arrays wherein the plurality of channels includes, at least a first channel and a second channel, each of the first and second channels defining an entrance and an exit, the exits of each of the first and second channels providing access to a common region also defined in the substrate.

16. The traveling wave grid assembly of claim 15, wherein the plurality of individually addressable electrodes includes, a first traveling wave grid extending within the first channel and in communication with the electronic controller; and a second traveling wave grid extending within the second channel and in communication with the electronic controller;

wherein upon operation of the electronic controller, at least one waveform is applied to the first and second traveling wave grids to thereby produce traveling waves along the first and second channels defined in the member.

17. The traveling wave grid assembly of claim 16 wherein the first and second channels extend parallel to one another.

18. The traveling wave grid assembly of claim 16 wherein the first and second channels extend non-parallel to one another.

* * * * *